(12) United States Patent
Ohashi

(10) Patent No.: US 7,167,320 B2
(45) Date of Patent: Jan. 23, 2007

(54) ZOOM LENS AND INFORMATION DEVICE INCLUDING THE SAME

(75) Inventor: Kazuyasu Ohashi, Funabashi (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 11/357,976

(22) Filed: Feb. 22, 2006

(65) Prior Publication Data

US 2006/0193062 A1    Aug. 31, 2006

(30) Foreign Application Priority Data

Feb. 23, 2005    (JP) .............................. 2005-047214

(51) Int. Cl.
*G02B 15/14*    (2006.01)

(52) U.S. Cl. ..................................... 359/687

(58) Field of Classification Search ................ 359/683, 359/686, 687
See application file for complete search history.

(56) References Cited

U.S. PATENT DOCUMENTS 5,528,423 A * 6/1996 Arimoto et al. ............ 359/687
6,556,356 B1 * 4/2003 Ohtake ...................... 359/687

FOREIGN PATENT DOCUMENTS

| JP | 2859734 | 12/1998 |
|---|---|---|
| JP | 3008380 | 12/1999 |
| JP | 2001-56436 | 2/2001 |
| JP | 2003-315676 | 11/2003 |
| JP | 2004-212616 | 7/2004 |
| JP | 2004-212618 | 7/2004 |
| JP | 2004-226645 | 8/2004 |

* cited by examiner

Primary Examiner—Scott J. Sugarman
Assistant Examiner—M. Hasan
(74) Attorney, Agent, or Firm—Oblon, Spivak, McClelland, Maier & Neustadt, P.C.

(57) ABSTRACT

A zoom lens, comprising: a first lens group (I) having positive refractive power, a second lens group (II) having negative refractive power, an aperture stop (S), a third lens group (III) having positive refractive power and a fourth lens group (IV) having positive refractive power, wherein the first and third lens groups (I, III) move toward the object side according to a change in magnification power as the zoom lens shifts from a wide-angle position to a telephoto position, the aperture stop (S) moves independently from the lens groups (I, III), and a following formula is satisfied: 0.30<X1/fT<0.85 (1), where X1 represents a total amount of a movement of the first lens group in accordance with a change in magnification power and fT represents a focal length of an entire optical system of the zoom lens in the telephoto position.

23 Claims, 12 Drawing Sheets

ZOOM LENS AND INFORMATION DEVICE INCLUDING THE SAME

BACKGROUND

1. Field of the Invention

The present invention relates to a zoom lens and a information device. A zoom lens according to the invention can be suitably used for a digital camera, and also, be used for a camcorder or a silver salt camera. An information device according to the invention can be embodied as a digital camera, a camcorder, a silver salt camera, etc., and further, be embodied as a portable information terminal device.

2. Description of Related Art

Nowadays the market for digital cameras has expanded and users have various demands for digital cameras. The users always desire enhancement of quality of photographed images and miniaturization of a main body of a digital camera. Thus, compatibility of improvement in performance and miniaturization is also desired for a zoom lens used as a photographing lens.

In order to accomplish the miniaturization of a zoom lens, it is necessary to shorten an overall length of lenses when in use (i.e., a distance from a lens surface which is nearest to an object side to an image plane), and also it is important to reduce thickness of each group of lenses to curb the overall length at the time of storage.

In order to accomplish the improvement in performance, in light of resolving power it is necessary to secure resolving power corresponding to an imaging device having the number of pixels of at least four million, or preferably, pixels of eight million or over.

Additionally, there are a number of users who desire widening of a field angle of the photographing lens, so that it is desirable to provide a half field angle of a wide-angle position of the zoom lens to be more than 38 degrees. The half field angle having 38 degrees is equivalent to a focal length of 28 mm in terms of a 35 mm silver salt camera using a 35 mm size (so-called Leica size) silver salt film.

Furthermore, it has been desired that magnification power is as large as possible. It is considered to be possible to deal with most of the general photographing if a zoom lens has a focal length of worth 28 mm to 135 mm in terms of 35 mm silver camera (i.e., approximately 4.8 times magnification power).

Conventionally, as a zoom lens consisting of four groups of lenses there is disclosed in Japanese Patent Laid-Open No. 04-190211 ("Reference 1") a zoom lens including a first group of lenses having positive refractive power, a second group of lenses having negative refractive power, an aperture stop, a third group of lenses having positive refractive power and a fourth group of lenses having positive refractive power which are subsequently arranged from an object side to an image side, wherein during a change in magnification power carried out from a wide-angle position to a telephoto position, the first group of lenses and the third group of lenses move monotonously to the object side, the second group of lenses remains unmoved and the fourth group of lenses moves.

In Japanese Patent Laid-Open No. 04-296809 ("Reference 2") there is also disclosed a zoom lens having the four-group structure as described above, wherein during a change in magnification power carried out from a wide-angle position to a telephoto position the first group of lenses and the third group lenses move monotonously to the object side, the second group of lenses moves monotonously to the image side and the fourth group of the lenses moves.

In Japanese Patent Laid-Open Nos. 2003-315676, 2004-212616, 2004-212618 and 2004-226645 ("Reference 3–6", respectively) there is also disclosed a zoom lens having the four-group structure as described above, wherein during a change in magnification power carried out from a wide-angle position to a telephoto position the first group of lenses and the third group of lenses move monotonously to the object side and the second group of lenses moves toward the object side after the second group of lenses once moves toward the image side.

According to the zoom lenses disclosed in the References 1 and 2 a half field angle of a wide-angle position of the zoom lenses falls within about 25 to 32 degrees. In the References 3 to 6 a zoom lens having a half field angle of a wide-angle position of the zoom lens which falls within 34 to 37 degrees is proposed. However, the magnification power of such zoom lens is up to four-odd times.

SUMMARY

The present invention has been made in consideration of above mentioned actualities, thus an object of the invention is to provide a zoom lens capable of obtaining a sufficient wide field angle in which a half field angle in a wide-angle position is equal to or more than 38 degrees, the zoom lens having magnification power of 4.5 times or over, being small in size and capable of obtaining resolving power corresponding to an imaging device having the number of pixels of 4 million to 8 million pixels or of more than 8 million pixels. Another object of the invention is to provide an "information device capable of carrying out a photographing function" which includes such zoom lens as an optical system for photographing.

As shown in FIG. 1, a zoom lens according to the present invention has a "four-group structure" as a basic structure, the four-group structure including a first lens group 'I' having positive refractive power, a second lens group 'II' having negative refractive power, an aperture stop 'S', a third lens group 'III' having positive refractive power and a fourth lens group 'IV' having positive refractive power which are subsequently arranged from an object side (the left side of the FIG. 1) to an image side, wherein when the magnification power changes from the wide-angle position (shown in the top diagram of FIG. 1) to the telephoto position (shown in the bottom diagram of FIG. 1), the first lens group I and the third lens group III move toward the object side and the aperture stop S moves independently from the lens groups next thereto (i.e., the second lens group II and the third lens group III).

The zoom lens of the invention includes the above-described basic structure and according to one zoom lens of the invention a following formula is satisfied:

$$0.30 < X1/fT < 0.85 \qquad (1)$$

where 'X1' represents a total amount of movement of the first lens group in accordance with a change in magnification power from the wide-angle position to the telephoto position, and 'fT' represents a focal length of the entire optical system at the telephoto position.

According to the structure as described above, it can be provided a downsized zoom lens having a sufficiently wide field angle whose half field angle at a wide angle position is 38 degrees or over and magnification power of 4.5 times or over, as well as having resolving power corresponding to an image pickup-device having the number of pixels of 4 million to 8 million pixels or more than 8 million pixels.

Another one of the present invention can be the above-described zoom lens, wherein the aperture stop moves so that the distance between the aperture stop and the third lens group in the wide-angle position be wider than that in the telephoto position is, and a following conditional formula is satisfied:

$$0.10 < dsw/fT < 0.25 \quad (2)$$

where dsw represents a distance between the aperture stop and a surface of the third lens group nearest to the object side on an optical axis of the zoom lens, and fT represents a focal length of an entire optical system of the zoom lens in the telephoto position.

According to this structure, the zoom lens can be further downsized.

Another zoom lens of the present invention includes the above-described basic structure, wherein a following conditional formula is satisfied:

$$0.10 < dsw/fT < 0.25 \quad (2)$$

where dsw represents a distance between the aperture stop and a surface of the third lens group nearest to the object side on an optical axis of the zoom lens, and fT represents a focal length of an entire optical system of the zoom lens in the telephoto position.

By applying this condition to the basic structure it can be also provided a downsized zoom lens having magnification power of 4.5 times or over as well as a sufficient wide-angle where a half-angle in the wide-angle position is equal to or more than 38 degrees, and resolving power capable of corresponding to a photographing element which has the number of pixels of 4 million to 8 million pixels or of more than 8 million pixels.

Another zoom lens of the present invention may have a structure wherein "the distance between the aperture stop and the third lens group becomes widest in the wide-angle position and becomes narrowest in the telephoto position".

According to this structure, each aberration can be corrected well, allowing the performance of the zoom lens enhanced.

According to another zoom lens of the present invention, a following conditional formula may be satisfied:

$$0.15 < X3/fT < 0.50 \quad (3)$$

where X3 represents a total amount of a movement of the third lens group in accordance with a change in magnification power from the wide-angle position to the telephoto position, and fT represents a focal length of the entire optical system of the zoom lens in the telephoto position.

According to another zoom lens of the present invention, a following conditional formula may be satisfied:

$$0.6 < |f2|/f3 < 1.0 \quad (4)$$

where f2 represents a focal length of the second lens group and f3 represents a focal length of the third lens group.

According to another zoom lens of the present invention, a following conditional formula may be satisfied:

$$6.0 < f1/fW < 12.0 \quad (5)$$

where f1 represents a focal length of the first lens group and fW represents a focal length of the entire optical system of the zoom lens in the wide-angle position.

According to another zoom lens of the present invention, a following conditional formula may be satisfied:

$$0.60 < m4T < 0.85 \quad (6)$$

where m4T represents magnification power of imaging of the fourth lens group in the telephoto position. In this case, preferably, a following conditional formula may be satisfied:

$$1.0 < m4T/m4W < 1.3 \quad (7)$$

where m4W represents magnification power of imaging of the fourth lens group in the wide-angle position, and m4T represents magnification power of imaging of the fourth lens group in the telephoto position.

According to another zoom lens of the present invention, preferably, the second lens group may include three lenses: a negative lens which has a surface having a large curvature, the surface facing toward the image side; a positive lens which has a surface having a large curvature, the surface facing toward the image side; and a negative lens has a surface having a large curvature, the surface facing toward the object side; which are subsequently arranged from the object side to the image side.

According to this structure, further correction of each aberration is enabled.

According to another zoom lens of the present invention, during a change in the magnification power from the wide-angle position to the telephoto position the second lens group may remain "unmoved" or move so that "the second lens group in the telephoto position be located closer to the image side than that in the wide-angle position is".

An information device according to the present invention having a photographing function includes "any one of the above-described zoom lenses as a photographing optical system". The information device may be an information device wherein an image of an object obtained with the zoom lens is imaged onto a light-receiving surface of an imaging element. In this case, the number of pixels of such element can be 4 million to 8 million pixels or more than 8 million pixels.

As described above the image information according to the present invention can be used as a digital camera, a camcorder, a silver salt camera and the like. Also the image information device can be suitably used as a portable information terminal device.

For additional explanation, a zoom lens of this type of the present invention consisting of "four lens groups including positive lens/negative lens/positive lens/positive lens" generally includes a second lens group which serves as a "so-called variator which bears a main magnification power function".

However, according to the present invention the third lens group of the zoom lens partly bears the magnification power to lighten the load of the second lens group as to magnification power, so that "aberration corrections which become more complicated when an field angle is more widened and/or magnification power is more enhanced" can be carried out with grate flexibility.

By way of driving the first lens group "to move toward the object side largely" in accordance with a change in magnification power from the wide-angle position to telephoto position, "a height of light beam which passes through the first lens group" at the wide-angle position can be reduced and thus it can be restrained the size of the first lens group enlarged due to a widened field angle, and at the telephoto position a long focal point can be achieved by widening the distance between the first lens group and the second lens group.

When magnification power changes due to a change of a state of the zoom lens from the wide angle position to the telephoto position, the first lens group and second lens group move toward the object side monotonously. Due to this movement the distance between the first lens group and the second lens group is widened and the distance between the second lens group and the third lens group is shortened. Thus each magnification power of the second lens group and the third lens group is enhanced, allowing each lens to bear the function of magnification power.

Further, by the structure wherein "the aperture stop moves independently from other lens groups next thereto", a more proper light path can be selected at any position within an area corresponding to large magnification power equal to or more than 4.5 times. Especially, flexibility of corrections of a coma aberration and/or a curvature of an image plane can be enhanced and therefore improvement in the off-axis performance can be achieved.

The conditional formula (1) is a important condition for widening a field angle and enlarging a long focal point which relates to an amount of a movement of the first lens group. When a conditional formula (1) is satisfied a "sufficient correction of aberration" is enabled.

If the parameter 'X1/fT' in the conditional formula (1) becomes less than 0.30, the function of the second lens group for magnification power reduces. In this case, a "load of magnification power" of the third lens group increases or refractive power of the first and second lens groups need be strengthened, and as a result each aberration deteriorates in any way. Further, the entire length of the lens at wide-angle position becomes longer, giving rise to increase of a height of light beam which passes through the first lens group and enlargement in size of the first lens group.

On the other hand, if the parameter X1/fT becomes more than 0.85, the entire length of the lens in the wide-angle position becomes too short or that in the telephoto position becomes too long. In the case where the entire length of the lens in the wide-angle position becomes too short a movement range for the third lens group is greatly restricted. Thus the load of magnification power of the third lens group reduces and to carry out aberration correction totally becomes complicated. In the case where the entire length of the lens in the telephoto position becomes too long, "downsizing the zoom lens in the longitudinal direction" is obstructed by the length. Further, the size of the zoom lens in a radial direction may be increased in order to "secure peripheral luminance in telephoto position", and deterioration of image quality may tend to occur due to manufacturing errors such as collapse of a lens barrel.

Preferably, a following conditional formula (1A) may be satisfied instead of the formula (1).

$$0.40 < X1/fT < 0.75 \tag{1A}$$

Preferably, the distance between the aperture stop and the third lens group in the wide-angle position is wider than that in the telephoto position is. By way of widening the distance between the aperture stop and the third lens group and by the aperture stop closer to the first lens group in the wide-angle position, a "height of light beam which passes through the first lens group" can be further reduced. Therefore, further downsizing of the first lens group can be achieved.

In this case, preferably, as to the position of the aperture stop, the conditional formula (2) may be satisfied.

If a parameter 'dsw/fT' in the formula (2) becomes less than 0.10, the height of light beam which passes through the first lens group becomes too large, giving rise to enlargement of the first lens group in size and difficulty in keeping balance of aberration in the magnification power changing area. Thus, a high off-axis performance is difficult to be carried out.

If the parameter 'dsw/fT' becomes more than 0.25, the height of light beam which passes through the third lens group becomes too large, giving rise to excessive collapse of an image plane or enlargement of barrel distortion aberration. Thus it becomes difficult to secure high performance especially in the wide-angle area.

Technical ideas of the conditional formula (2) can be also applied to the above-described basic structure of the zoom lens according to the present invention.

Another aspect of the present invention, preferably, the distance between the aperture stop and the third lens group "becomes widest in the wide-angle position and becomes narrowest in the telephoto position". If the distance between the aperture stop and the third lens group becomes widest in "a position other than the wide-angle position", the height of light beam which passes through the third lens group becomes largest in "the position", giving rise to difficulty in keeping balance of off-axis aberrations throughout the magnification power changing area. If the distance between the aperture stop and the third lens group becomes narrowest in a "position other than the telephoto position", the distance between the second lens group and the third lens group cannot be sufficiently narrowed in the telephoto position. Thus, in this case, the contribution of the third lens group for the magnification power decreases, giving rise to difficulty in carrying out entire aberration corrections.

The conditional formula (3) is a condition which relates to an amount of a movement of the third lens group. If the parameter X3/fT becomes less than 0.15, the contribution of the third lens group for the magnification power decreases, giving rise to increase in load of the magnification power of the second lens group or necessity of strengthening the refractive power of the third lens group itself. As a result each aberration deteriorates in any way.

If the parameter X3/fT becomes more than 0.50, the total length of the zoom lens becomes larger, giving rise to increase of the height of light beam which passes through the first lens group. As a result the size of the first lens group should be larger.

More preferably, for the zoom lens of the present invention the following conditional formula may be satisfied:

$$0.20 < X3/fT < 0.45 \tag{3A}$$

The conditional formulas (4) and (5) of the present invention are used for improving aberration corrections.

If the parameter '|f2|/f3' in the formula (4) becomes less than 0.6, the refractive power of the second lens group becomes too strong. On the other hand if the parameter '|f2|/f3' becomes more than 1.0, the refractive power of the third lens group becomes too strong. Thus, in this case, "the range of the fluctuation of aberration due to a change in magnification power" tends to increase in any way.

If the parameter 'f1/fW' in the formula (5) becomes less than 6.0, the imaging magnification power of the second lens group nears to the equivalent magnification power and thus it is advantageous to perform higher magnification power, however, each lens of the first lens group need have high refractive power, giving rise to deterioration in color aberration especially in the telephoto position. Also the first lens group need to be thicken and the diameter thereof need to be enlarged, giving rise to disadvantage in downsizing the zoom lens especially in a collapsed state.

If the parameter 'f1/fW' exceeds 12.0, the contribution of the second lens group decreases, giving rise to difficulty in carrying out high magnification power.

The fourth lens group can be driven so that "the position thereof in the telephoto position can be located closer to the image side than that in the wide-angle position is". By such movement the magnification power of the fourth lens group increases in accordance with a change in the magnification power of the zoom lens from the wide-angle position to the telephoto position. Thus, since the fourth lens group can bear the magnification power, a change in magnification power can be effectively carried out in a limited space.

The conditional formula (6) enables a zoom lens to perform a targeted wide angle and a high magnification power as well as sufficient aberration corrections. If the parameter 'm4T' becomes less than 0.60, light flux which emerges from the third lens group approaches to an afocal state. Thus, the load of the magnification power of the second lens group increases, giving rise to difficulty in correcting "astigmatism and/or field curvature which increases in accordance with increase in a field angle".

If the parameter 'm4T' becomes more than 0.85, a necessary back focal length cannot be obtained due to propinquity of the fourth lens group to the image plane, or the refractive power of the fourth lens group becomes too low. In the case the refractive power is too low, the exit pupil nears to the image plane. Thus, the angle of incidence of the light to the periphery of the photographing element becomes larger, giving rise to a shortage of quantity of light to the periphery.

More preferably, the following conditional formula (6A) may be satisfied instead of the condition (6).

$$0.65 < m4T < 0.80 \quad (6A)$$

The conditional formula (7) of the present invention relates to a condition as to "a change in magnification power of the fourth lens group in accordance with a change in magnification power from the wide-angle position to telephoto position". If the value of the parameter 'm4T/m4W' is less than 1.0, the fourth lens group does not contribute to changing the magnification power. Thus the functional loads in changing magnification power of the second and third lens groups increase, giving rise to difficulty in keeping balance of the image plane during a change in the magnification power.

On the other hand if the value of the parameter 'm4T/m4W' is more than 1.3, the load in changing magnification power of the fourth lens group becomes too great. Therefore, it is difficult to make aberration corrections with the fourth lens group having, e.g., a "simple structure consisting of one positive lens".

More preferably, instead of the condition (7), the following conditional formula (7A) may be satisfied.

$$1.05 < m4T/m4W < 1.2 \quad (7A)$$

Conditions for better aberration corrections which may not disturb downsizing will be described below.

Preferably, the second lens group may includes or consists of three lenses: a negative lens which has a surface having a large curvature, the surface facing toward the image side; a positive lens which has a surface having a large curvature, the surface facing toward the image side; and a negative lens has a surface having a large curvature, the surface facing toward the object side; which are subsequently arranged from the object side to the image side.

As a lens for changing magnification power having negative refractive power which consists of three lenses, it is conventionally known a "structure having a negative lens, a negative lens and a positive lens which are subsequently arranged from the object side to the image side". In comparison with this structure, the above-described structure excels in performance of correction of chromatic aberration of magnification due to widening a field angle. The second and third lenses from the object side may be cemented accordingly.

Preferably, in the second lens group having the above-mentioned structure, the lenses of the second lens group may respectively satisfy the following conditional formulas (8A), (8B), (8C).

$$1.75 < N21 < 1.90, \ 35 < v21 < 50 \quad (8A)$$

$$1.65 < N22 < 1.90, \ 20 < v22 < 35 \quad (8B)$$

$$1.75 < N23 < 1.90, \ 35 < v23 < 50 \quad (8C)$$

In the formulas (8A), (8B), (8C), 'N2i' represents "refractive power of a lens 'i' numbered from the object side in the second lens group", and 'v2i' represents "an Abbe number of a lens 'i' numbered from the object side in the second lens group". By selecting glass types capable of satisfying those conditions, more proper correction of chromatic aberration is enabled.

Preferably, the first lens group has a "structure provided with at least one negative lens and at least one positive lens". Specifically, the first lens group may constructed by two lenses composed of "a negative meniscus lens whose convex surface faces toward the object side and a positive lens whose strong convex surface faces toward the object side" subsequently arranged from the object side to the image side, or by three lenses composed of "a negative meniscus lens whose convex surface faces toward the object side, a positive lens whose strong convex surface faces toward the object side and a positive lens whose strong convex surface faces toward the object side" subsequently arranged from the object side to the image side.

Preferably, the third lens group may be composed of three lenses consisting of "a positive lens, a positive lens and a negative lens" subsequently arranged from the object side to the image side. In this case, the second and third lenses counted from the object side may be cemented accordingly.

The fourth lens group preferably consists of one positive lens. When the zoom lens is focused on an object at a finite distance, a "method by which only the fourth lens group is moved" may be advantageously used because weight of an object to be moved is the lightest. The amount of the movement of the fourth lens group due to a change in magnification power is small. Also, the smaller amount of the movement of the fourth lens group due to a change in magnification power is advantageous, because a driving mechanism can be used not only for changing magnification power but also for focusing.

Use of an aspheric surface is effective in order to downsize a zoom lens capable of making suitable aberration corrections. Preferably at least second and third lenses are respectively provided with at least one aspheric surface. Especially, if both of "surfaces nearest to the object side and nearest to the image side" of the second lens group are aspheric surface, "correction of distortion aberration, astigmatism, etc. which tend to increase according to widening a field angle" can be made more effectively.

A molded optical glass/plastic (aspheric surface of molded glass, aspheric surface of molded plastic), a glass lens having a surface coated with a thin resin layer thereon, the surface of which is an aspheric surface (so-called, hybrid aspheric surface, replica aspheric surface, etc.) and the like may be employed as a aspheric lens.

Preferably, the diameter of an aperture of the aperture stop may "remain unchanged regardless of a change in magnification power" in view of simplicity of mechanism. On the other hand a change of F-number due to a change in magnification power can be kept within a narrower range by the diameter of an aperture of the aperture stop at the long focal position which is shorter than that at short focal position is. The diameter of an aperture of the aperture stop may be shortened when "quantity of light which reaches the image plane need be reduced". However, it is preferred that the quantity of light is reduced with an inserted ND filter, etc. without a great change in length of the diameter of the aperture because reduction of resolving power due to diffraction phenomenon can be restrained.

As described above, according to the present invention, it can be provided a downsized zoom lens having a sufficiently wide field angle where a half field angle of the wide angle position is equal to or more than 38 degrees as well as magnification power of 4.5 times or over, and having resolving power corresponding to a image pickup-device having the number of pixels of 4 million to 8 million pixels or more than 8 million pixels. Also, according to the present invention, it can be provided an information device including the zoom lens of the present invention, which is capable of being miniaturized and of carrying out a photographing function at high performance.

These and other objects, features and advantages of the invention will be appreciated upon reading of the description of the invention when in conjunction with the attached drawings, with the understanding that some modifications, variations and changes of the invention could be easily made by the skilled person in the art to which the invention pertains without departing from the spirit of the invention or the scope of the claims The present application is based on, and claims priority from, Japanese Patent Application No. 2005-047214, filed on Feb. 23, 2005, the contents of which are hereby incorporated by reference herein in its entirety.

BRIEF DESCRIPTION OF THE DRAWINGS

For a better understanding of the invention, reference is made to the attached drawings, wherein.

DETAILED DESCRIPTION OF THE PREFERRED EMBODIMENTS

Figure 1:
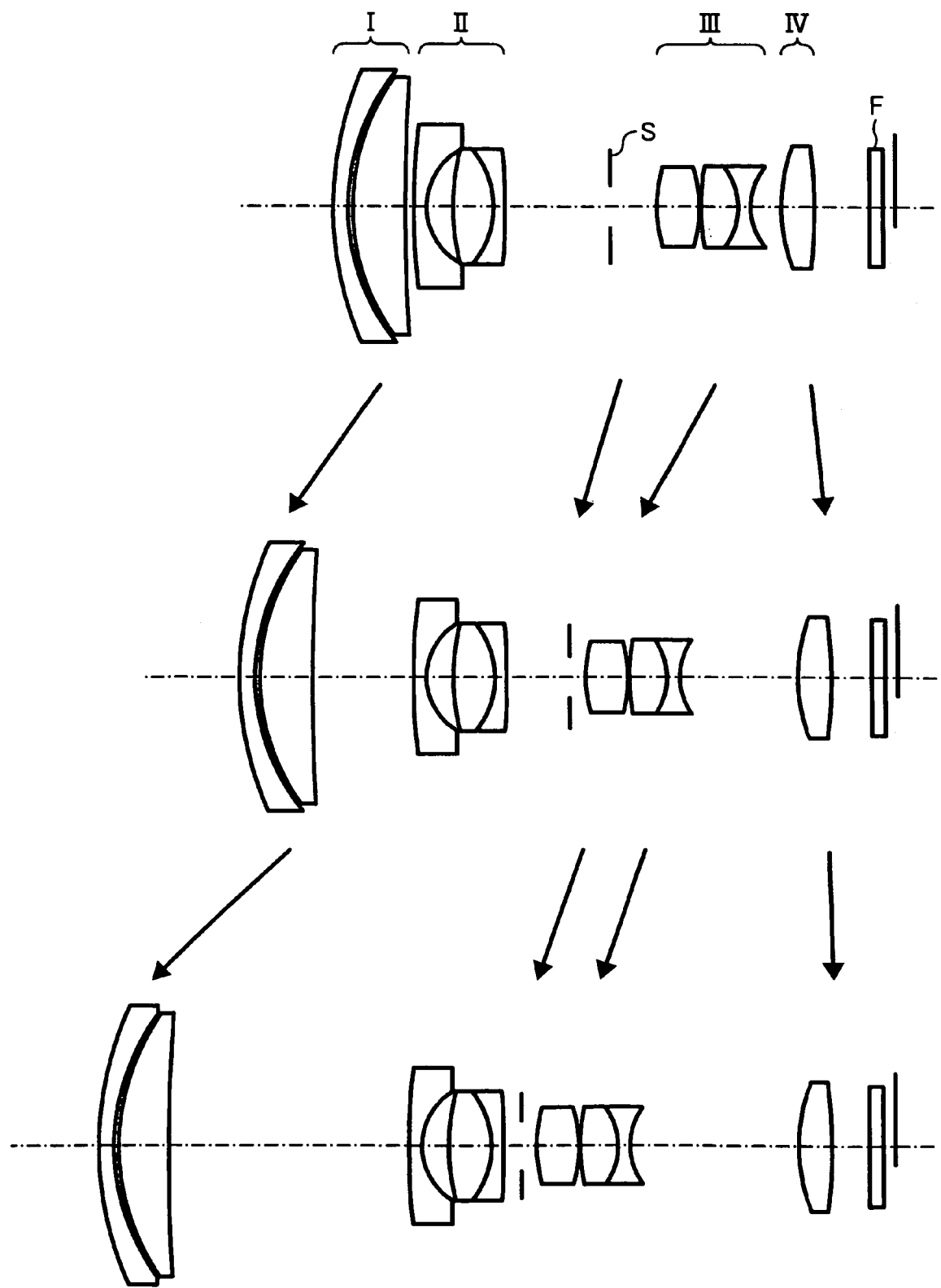
FIG. 1 is a schematic view showing a structure of lens groups of a first embodiment of the invention and illustrating movement of the lens groups.

Hereinafter by way of example four embodiments according to the present invention will be described on the basis of specific numeric values. In all of the embodiments a maximum image height is 3.70 mm. In each embodiment, a parallel plate (represented by 'F' in FIGS. 1 to 4) disposed on the side of the image plane of the fourth lens group is intended to be a filter (various filters) such as an optical low-pass filter, an infrared-cut filter, etc. or to be a cover glass (seal glass) of an image pickup-device such as a CCD and the like. "Millimeter(s)" shall be used for the unit of length in the description below if no otherwise statement is present.

The second embodiment is an example where "the fourth lens group remains unmoved during a change in magnification power", and in other embodiments each second lens groups remains unmoved during a change in magnification power. Meanwhile, the second lens group may monotonously move toward the image side when the state of the zoom lens changes from the wide-angle position to the telephoto position, or may move toward the image side such that the locus of movement during a change in magnification power may draw a curving line.

As to materials used for the lenses, optical plastic is used for the ninth lens in the first embodiment, the tenth lens of the third embodiment and the tenth lens of the fourth embodiment (each lens is employed as a fourth lens group). Optical glass is used for other lenses.

As it is demonstrated by the figures showing aberrations of the embodiments, each aberration of the embodiments is sufficiently corrected and each embodiment is capable of employing a light-sensitive element having 4 million pixels or over.

Meanings of various signs used in the first to fourth embodiments are as follows:

f: focal length of the entire optical system
F: F-number
ω: half field angle

R: curvature radius
D: face interval
$N_d$: refractive index
$v_d$: abbe number
K: conical constant of aspheric surface
$A_4$: fourth-order aspheric surface coefficient
$A_6$: sixth-order aspheric surface coefficient
$A_8$: eighth-order aspheric surface coefficient
$A_{10}$: tenth-order aspheric surface coefficient
$A_{12}$: twelfth-order aspheric surface coefficient
$A_{14}$: fourteenth-order aspheric surface coefficient
$A_{16}$: sixteenth-order aspheric surface coefficient
$A_{18}$: eighteenth-order aspheric surface coefficient A shape of an "aspheric surface" is defined by the following common formula:

$$X = C_o H^2 / \{1 + \sqrt{(1-(1+K)C_o^2 H^2)}\} + A_4 \cdot H^4 + A_6 \cdot H^6 + A_8 \cdot H^8 + A_{10} \cdot H^{10} + A_{12} \cdot H^{12} + A_{14} \cdot H^{14} + A_{16} \cdot H^{16} + A_{18} \cdot H^{18}$$

where a reciprocal of a paraxial curvature radius (paraxial curvature) is '$C_o$' and height from an optical axis is 'H', conical constant is 'K', and each aspheric surface coefficient is '$A_4$', '$A_6$', '$A_8$' . . . .

First Embodiment $f = 4.74 \sim 21.59$, $F = 3.32 \sim 4.98$, $\omega = 39.14 \sim 9.55$

| Surface No. | R | D | $N_d$ | $v_d$ | notes |
|---|---|---|---|---|---|
| 01 | 23.330 | 1.00 | 1.84666 | 23.80 | First lens |
| 02 | 15.002 | 0.26 | | | |
| 03 | 15.442 | 3.47 | 1.77250 | 49.60 | Second lens |
| 04 | 135.649 | variable (A) | | | |
| 05* | 91.446 | 0.84 | 1.83481 | 42.70 | Third lens |
| 06 | 4.439 | 1.77 | | | |
| 07 | 15.704 | 2.67 | 1.74077 | 27.80 | Fourth lens |
| 08 | −6.205 | 0.74 | 1.83481 | 42.70 | Fifth lens |
| 09* | 632.018 | variable (B) | | | |
| 10 | Aperture stop | variable (C) | | | |
| 11* | 8.333 | 2.78 | 1.58913 | 61.15 | Sixth lens |
| 12* | −8.607 | 0.10 | | | |
| 13 | 15.588 | 2.42 | 1.83481 | 42.70 | Seventh lens |
| 14 | −4.691 | 0.80 | 1.69895 | 30.10 | Eighth lens |
| 15 | 4.498 | variable (D) | | | |
| 16* | 12.500 | 2.21 | 1.54340 | 56.00 | Ninth lens |
| 17 | −34.711 | variable (E) | | | |
| 18 | ∞ | 0.90 | 1.51680 | 64.20 | Filter (various) |
| 19 | ∞ | | | | |

In the above table each of the lens surfaces represented by a surface number to which "*" (asterisk) is attached is a aspheric surface, and the same representations are used for describing other embodiments.

Aspheric Surface

Fifth Surface:
K=0.0, $A_4$=2.42400×10$^{-4}$, $A_6$=−2.92208×10$^{-6}$, $A_8$=9.40210×10$^{-9}$, $A_{10}$=−4.16456×10$^{-11}$ Ninth Surface:
K=0.0, $A_4$=−5.16761×10$^{-4}$, $A_6$=1.81605×10$^{-6}$, $A_8$=−1.01642×10$^{-6}$, $A_{10}$=−1.75699×10$^{-8}$ Eleventh Surface:
K=0.0, $A_4$=−1.08496×10$^{-3}$, $A_6$=−2.17192×10$^{-5}$, $A_8$=5.79037×10$^{-6}$, $A_{10}$=−5.25493×10$^{-7}$ Twelfth Surface:
K=0.0, $A_4$=4.85474×10$^{-4}$, $A_6$=−4.49460×10$^{-5}$, $A_8$=8.98429×10$^{-6}$, $A_{10}$=−5.68154×10$^{-7}$ Sixteenth Surface:
K=0.0, $A_4$=−5.46424×10$^{-5}$, $A_6$=1.80637×10$^{-5}$, $A_8$=−9.17793×10$^{-7}$, $A_{10}$=2.09899×10$^{-8}$ Variable Intervals

| | Short focal position f = 4.740 | Intermediate focal length f = 10.131 | Long focal position f = 21.591 |
|---|---|---|---|
| A | 0.600 | 6.655 | 15.680 |
| B | 7.051 | 4.217 | 1.200 |
| C | 3.043 | 1.054 | 1.000 |
| D | 2.000 | 7.725 | 10.995 |
| E | 3.484 | 2.583 | 2.382 |

Values of Parameters of the Condition $dsw/fT$=0.141

$X1/fT$=0.698

$X3/fT$=0.366

$|f2|/f3$=0.792

$f1/fW$=8.44 m4T=0.718 m4T/m4W=1.098

Figure 5:
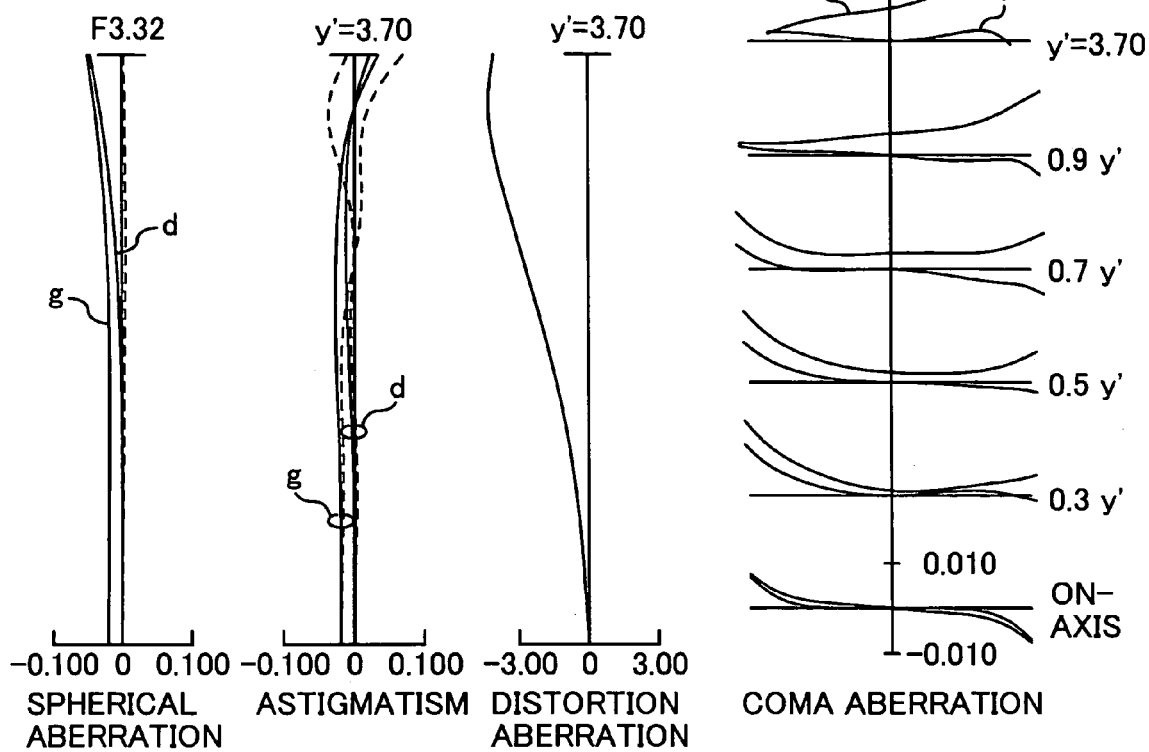
FIG. 5 is a view showing aberrations at a short focus position in the first embodiment.
Figure 6:
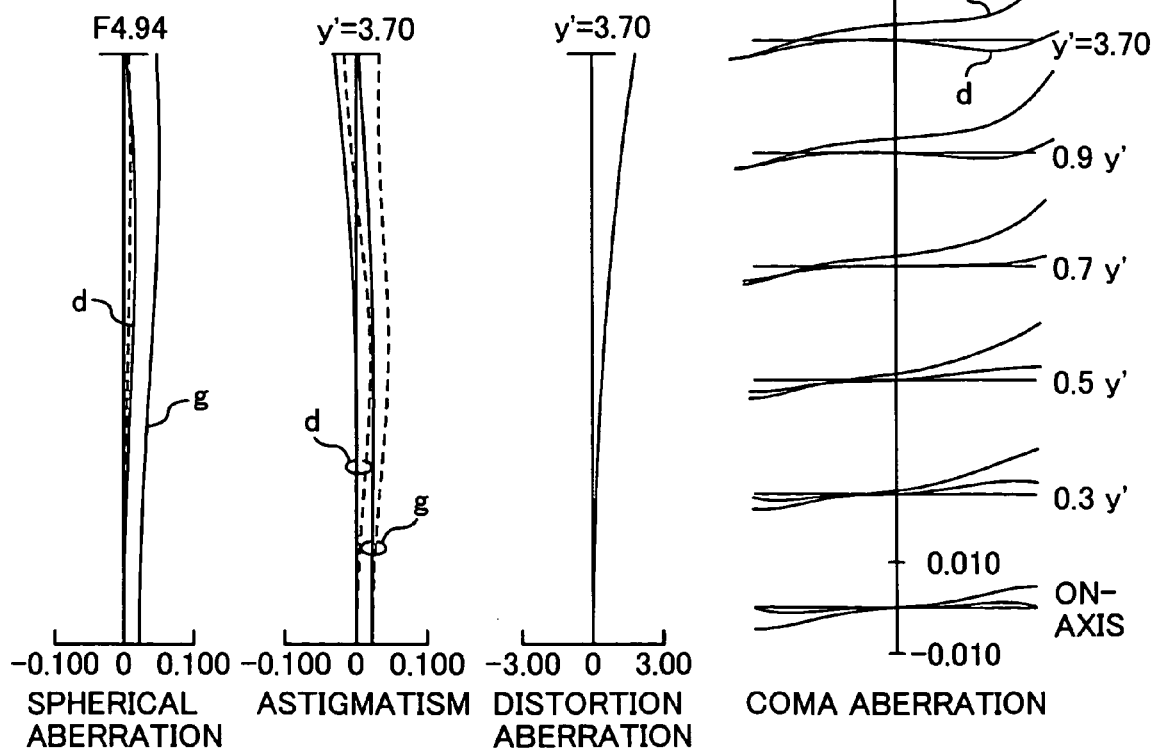
FIG. 6 is a view showing aberrations at an intermediate focal length in the first embodiment.
Figure 7:
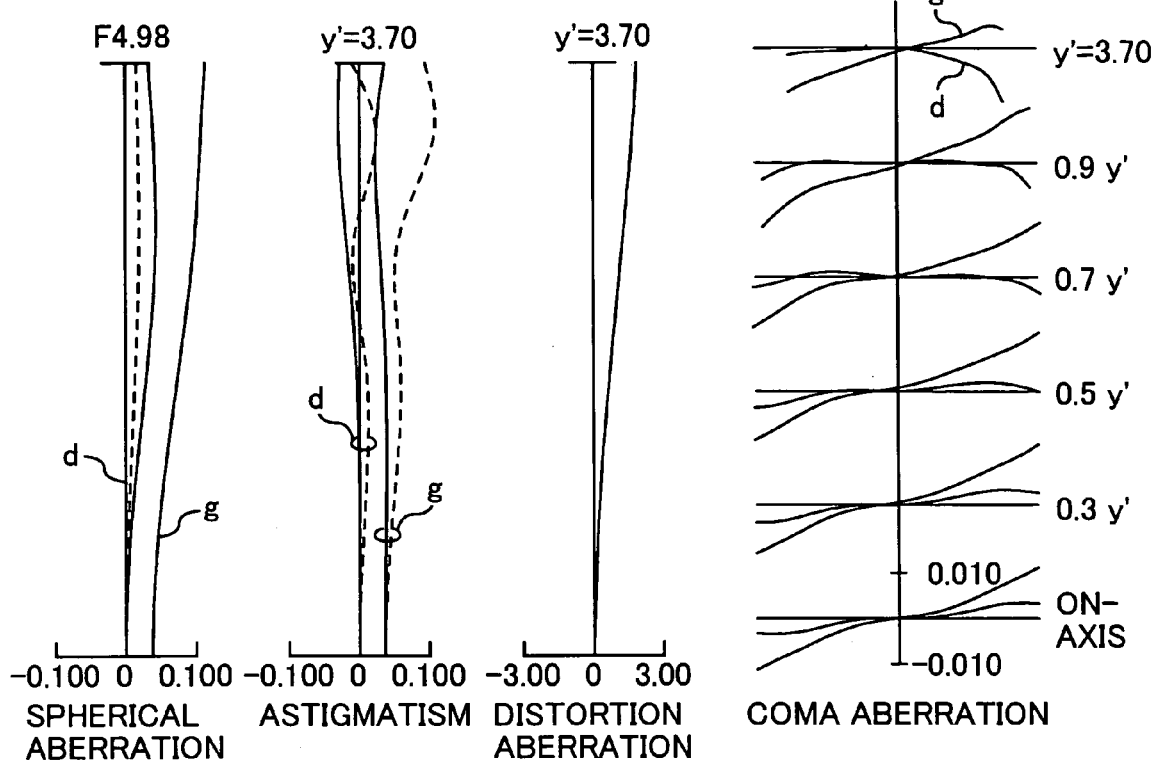
FIG. 7 is a view showing aberrations at a telephoto position in the first embodiment.

Distribution of the lenses of the zoom lens of the first embodiment is shown in FIG. 1. In FIG. 1 the upper diagram shows the state of a wide-angle position, the middle diagram shows an intermediate focal length, and the bottom diagram shows the state of a telephoto position. FIGS. 5, 6 and 7 respectively show aberrations in the short focal position (wide-angle position), aberrations at the intermediate focal length and the long focal position (telephoto position) of the first embodiment. Within each of FIGS. 5–7, a broken line in each spherical aberration diagram represents a sine condition, and a solid line and a broken line in each astigmatism diagram represent sagittal and meridional, respectively.

Second Embodiment $f = 4.74 \sim 21.55$, $F = 3.61 \sim 4.80$, $\omega = 39.16 \sim 9.64$

| Surface No. | R | D | $N_d$ | $v_d$ | notes |
|---|---|---|---|---|---|
| 01 | 18.565 | 0.90 | 1.92286 | 20.88 | First lens |
| 02 | 12.194 | 3.90 | 1.72342 | 37.99 | Second lens |
| 03 | 58.393 | variable (A) | | | |
| 04* | 70.501 | 0.84 | 1.83500 | 42.98 | Third lens |
| 05 | 4.859 | 2.42 | | | |
| 06 | 24.219 | 2.54 | 1.76182 | 26.61 | Fourth lens |
| 07 | −9.529 | 0.74 | 1.83500 | 42.98 | Fifth lens |
| 08* | −247.508 | variable (B) | | | |
| 09 | Aperture stop | variable (C) | | | |
| 10* | 8.333 | 3.01 | 1.58913 | 61.25 | Sixth lens |
| 11* | −10.376 | 0.10 | | | |
| 12 | 12.420 | 2.34 | 1.75500 | 52.32 | Seventh lens |
| 13 | −7.111 | 1.35 | 1.68893 | 31.16 | Eighth lens |
| 14 | 4.591 | variable (D) | | | |

-continued

| Surface No. | R | D | $N_d$ | $v_d$ | notes |
|---|---|---|---|---|---|
| 15* | 13.631 | 1.66 | 1.58913 | 61.25 | Ninth lens |
| 16 | −45.606 | variable (E) | | | |
| 17 | ∞ | 0.90 | 1.51680 | 64.20 | Filter (various) |
| 18 | ∞ | | | | |

Aspheric Surface

Fourth Surface:
 $K=0.0$, $A_4=1.78565\times10^{-4}$, $A_6=-1.75390\times10^{-6}$, $A_8=6.61261\times10^{-9}$, $A_{10}=1.23143\times10^{-11}$ Eighth Surface:
 $K=0.0$, $A_4=-3.04000\times10^{-4}$, $A_6=-7.18126\times10^{-6}$, $A_8=1.05398\times10^{-7}$, $A_{10}=-2.21354\times10^{-8}$ Tenth Surface
 $K=0.0$, $A_4=-6.40609\times10^{-4}$, $A_6=-7.03343\times10^{-6}$, $A_8=8.98513\times10^{-7}$, $A_{10}=-9.73391\times10^{-8}$ Eleventh Surface
 $K=0.0$, $A_4=2.20124\times10^{-4}$, $A_6=-8.24086\times10^{-6}$, $A_8=1.09927\times10^{-6}$, $A_{10}=-1.05069\times10^{-7}$ Fifteenth Surface
 $K=0.0$, $A_4=-5.79936\times10^{-5}$, $A_6=8.76394\times10^{-6}$, $A_8=-2.58155\times10^{-7}$, $A_{10}=4.31238\times10^{-9}$ Variable Intervals

| | Short focal position $f = 4.738$ | Intermediate focal length $f = 10.103$ | Long focal position $f = 21.545$ |
|---|---|---|---|
| A | 0.600 | 7.679 | 15.059 |
| B | 10.083 | 4.179 | 1.200 |
| C | 4.076 | 2.608 | 1.000 |
| D | 3.075 | 6.493 | 10.666 |
| E | 2.597 | 2.591 | 2.553 |

Values of Parameters of the Condition $dsw/fT=0.189$ $X1/fT=0.466$ $X3/fT=0.350$ $|f2|/f3=0.860$ $f1/fW=9.35$ $m4T=0.736$ $m4T/m4W=1.0$ (The fourth lens is fixed during a change in magnification power)

Figure 2:
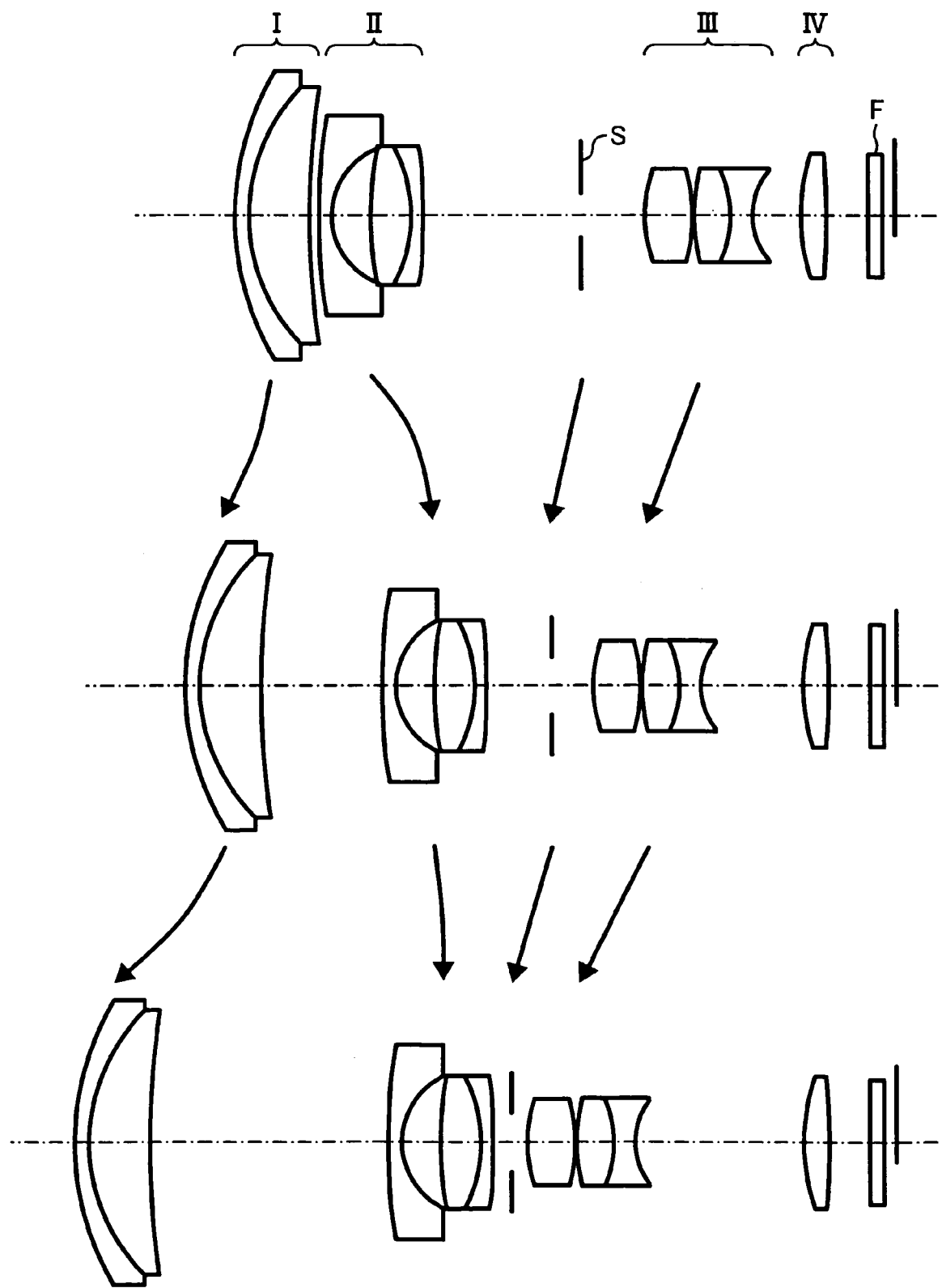
FIG. 2 is a schematic view showing a structure of lens groups of a second embodiment of the invention and illustrating movement of the lens groups.
Figure 8:
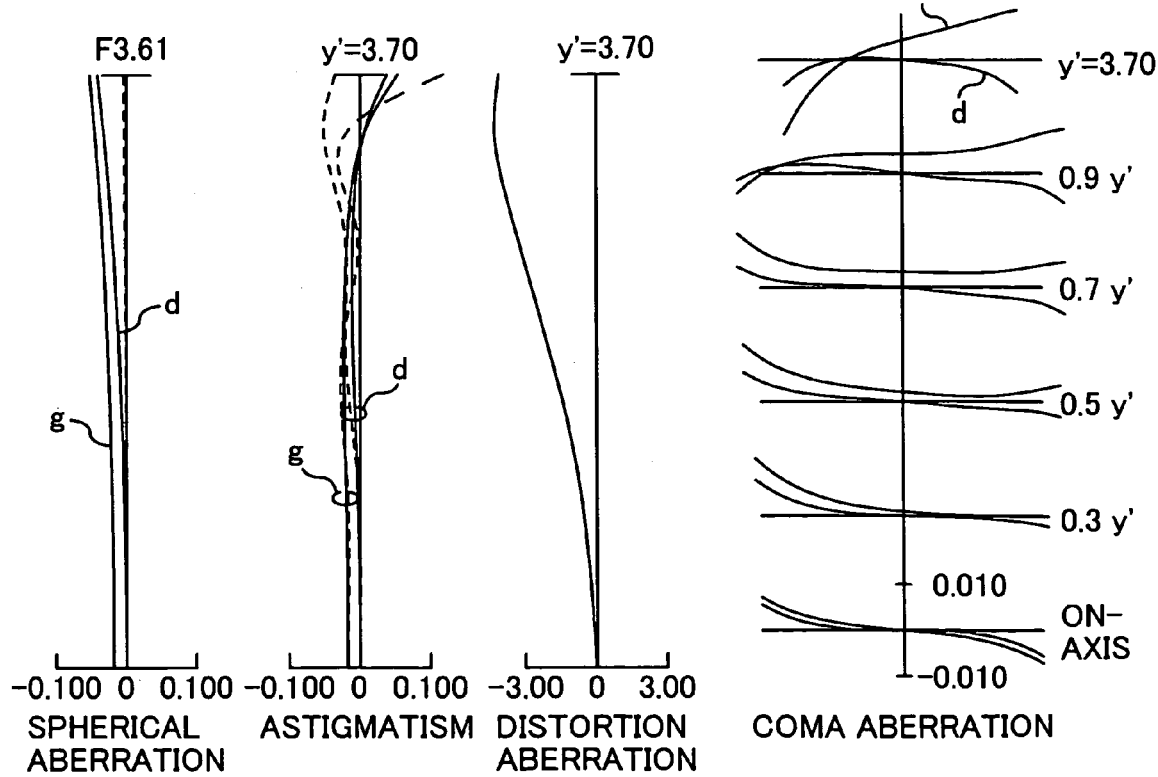
FIG. 8 is a view showing aberrations at a short focus position in the second embodiment.
Figure 9:
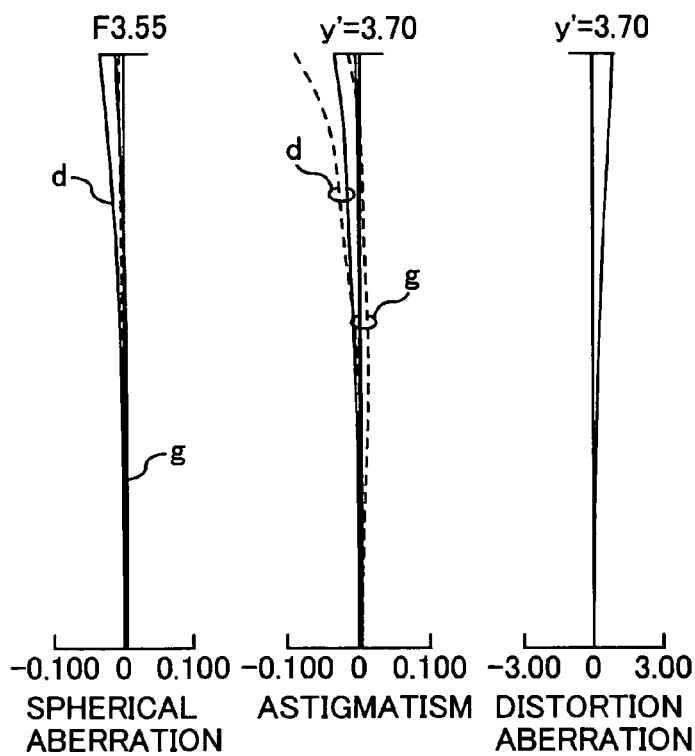
FIG. 9 is a view showing aberrations at an intermediate focal length in the first embodiment.
Figure 9:
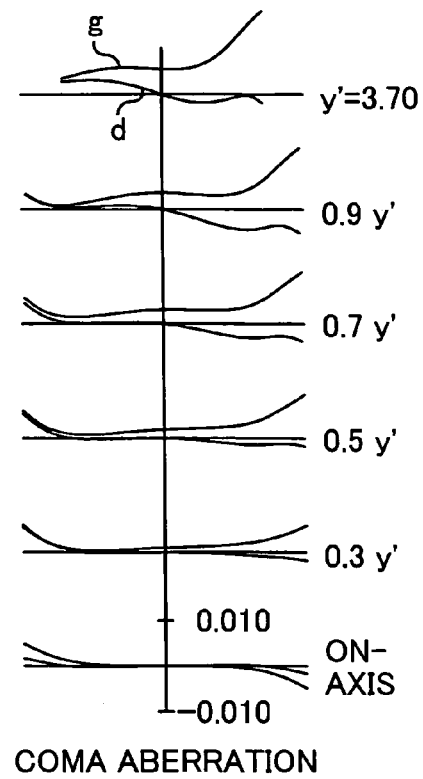
Figure 10:
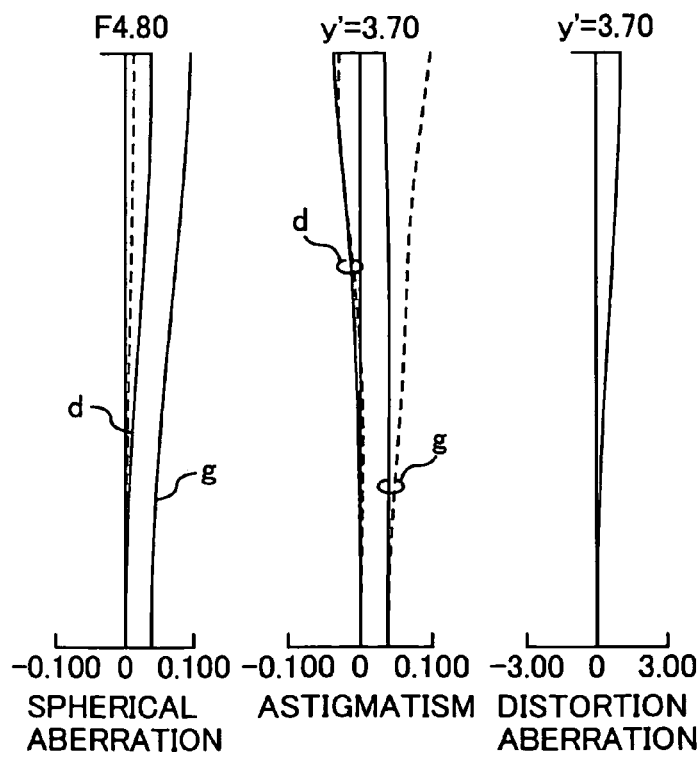
FIG. 10 is a view showing aberrations at a telephoto position in the second embodiment.
Figure 10:
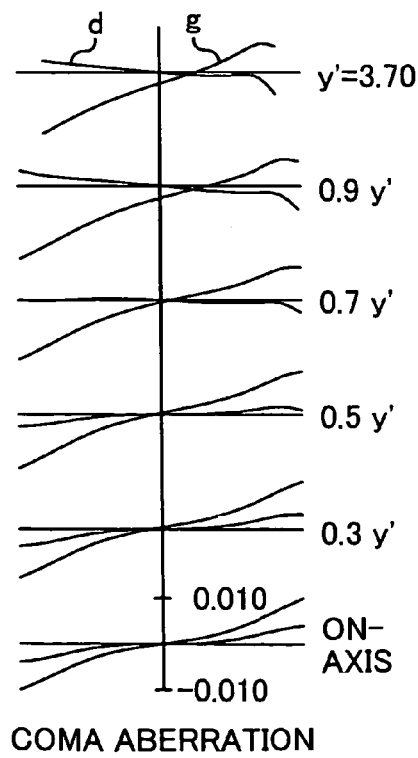

In FIG. 2 states of a wide-angle position, an intermediate focal length and a telephoto position of the second embodiment are illustrated as is the case of FIG. 1. FIGS. 8, 9 and 10 respectively show aberrations in the short focal position (wide-angle position), aberrations at the intermediate focal length and aberrations in the long focal position (telephoto position) of the second embodiment.

Third Embodiment $f=4.74\sim21.67$, $F=3.46\sim4.91$, $\omega=39.15\sim9.50$

| Surface No. | R | D | $N_d$ | $v_d$ | notes |
|---|---|---|---|---|---|
| 01 | 88.920 | 0.90 | 1.84666 | 23.78 | First lens |
| 02 | 27.776 | 2.67 | 1.77250 | 49.62 | Second lens |
| 03 | −397.862 | 0.10 | | | |
| 04 | 19.683 | 1.79 | 1.77250 | 49.62 | Third lens |
| 05 | 37.587 | variable (A) | | | |
| 06* | 19.021 | 0.79 | 1.83500 | 42.98 | Fourth lens |
| 07 | 3.765 | 2.11 | | | |
| 08 | ∞ | 1.66 | 1.84666 | 23.78 | Fifth lens |
| 09 | −7.904 | 0.64 | 1.80420 | 46.50 | Sixth lens |
| 10* | −76.544 | variable (B) | | | |
| 11 | Aperture stop | variable (C) | | | |
| 12* | 8.674 | 3.65 | 1.58913 | 61.25 | Seventh lens |
| 13* | −8.132 | 0.10 | | | |
| 14 | 14.331 | 2.43 | 1.75500 | 52.32 | Eighth lens |
| 15 | −6.459 | 0.80 | 1.69895 | 30.05 | Ninth lens |
| 16 | 5.298 | variable (D) | | | |
| 17* | 12.500 | 1.84 | 1.54340 | 56.00 | Tenth lens |
| 18 | −40.435 | variable (E) | | | |
| 19 | ∞ | 0.90 | 1.51680 | 64.20 | Filter (various) |
| 20 | ∞ | | | | |

Aspheric Surface

Sixth Surface:
 $K=0.0$, $A_4=-1.22579\times10^{-4}$, $A_6=-2.98179\times10^{-7}$, $A_8=-1.93092\times10^{-8}$, $A_{10}=-3.32554\times10^{-10}$ Tenth Surface:
 $K=0.0$, $A_4=-8.28512\times10^{-4}$, $A_6=-1.82812\times10^{-5}$, $A_8=8.50623\times10^{-8}$, $A_{10}=-1.90374\times10^{-7}$ Twelfth Surface:
 $K=0.0$, $A_4=-8.08852\times10^{-4}$, $A_6=1.58812\times10^{-5}$, $A_8=-1.00403\times10^{-6}$, $A_{10}=-2.75151\times10^{-8}$ Thirteenth Surface:
 $K=0.0$, $A_4=4.07275\times10^{-4}$, $A_6=-7.86358\times10^{-6}$, $A_8=1.60507\times10^{-6}$, $A_{10}=-9.33131\times10^{-8}$ Seventeenth Surface:
 $K=0.0$, $A_4=-1.29441\times10^{-5}$, $A_6=5.93123\times10^{-6}$, $A_8=-3.01006\times10^{-7}$, $A_{10}=7.06450\times10^{-9}$ Variable Intervals

| | Short focal position $f = 4.739$ | Intermediate focal length $f = 10.145$ | Long focal position $f = 21.665$ |
|---|---|---|---|
| A | 0.600 | 7.011 | 14.600 |
| B | 6.591 | 2.964 | 1.200 |
| C | 3.223 | 2.372 | 1.000 |
| D | 2.000 | 7.226 | 10.607 |
| E | 3.805 | 3.057 | 2.812 |

Values of Parameters of the Condition $dsw/fT=0.149$ $X1/fT=0.646$ $X3/fT=0.351$ $|f2|/f3=0.744$ $f1/fW=7.49$ m4T=0.712 m4T/m4W=1.085

Figure 3:
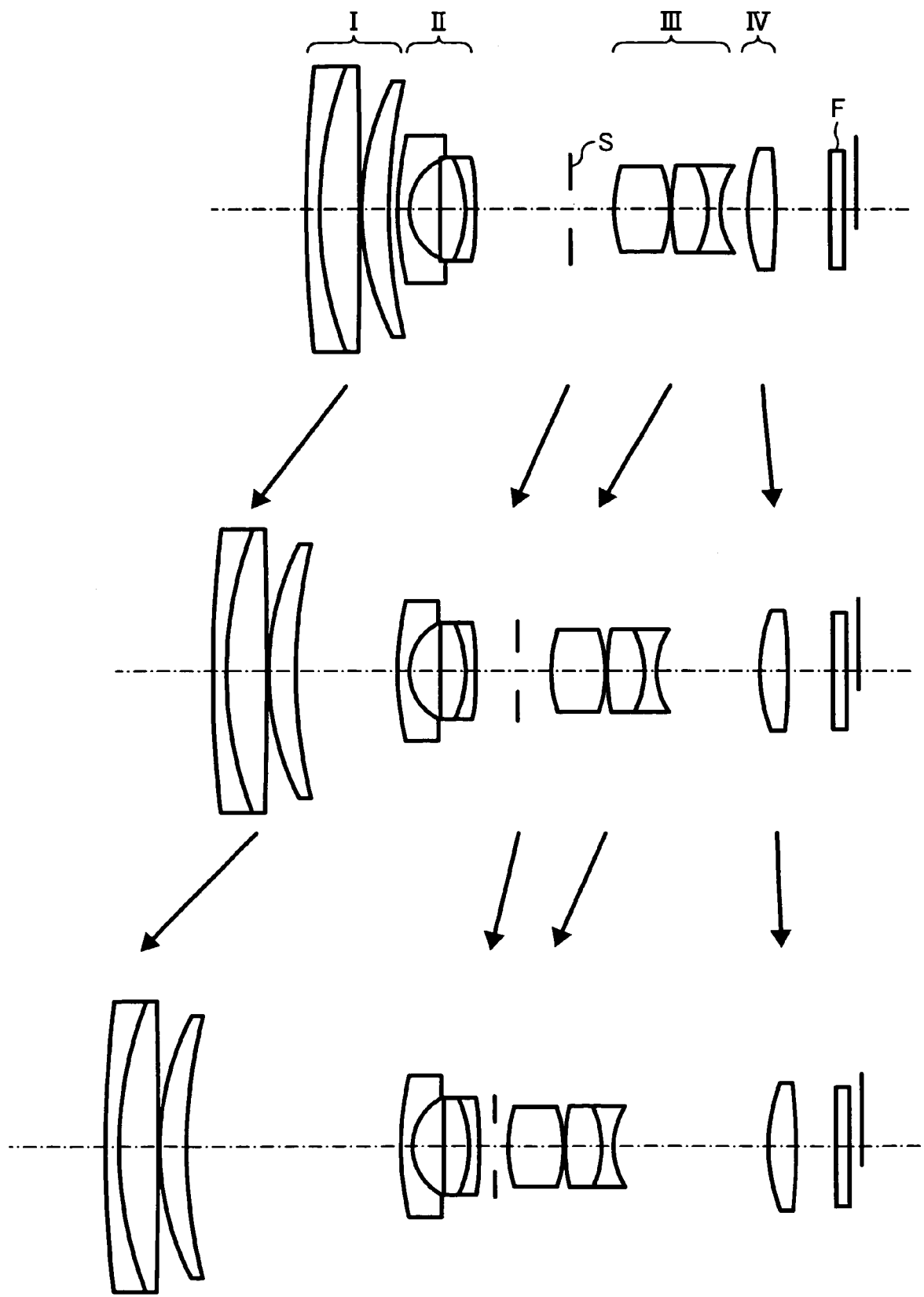
FIG. 3 is a schematic view showing a structure of lens groups of a third embodiment of the invention and illustrating movement of the lens groups.
Figure 11:
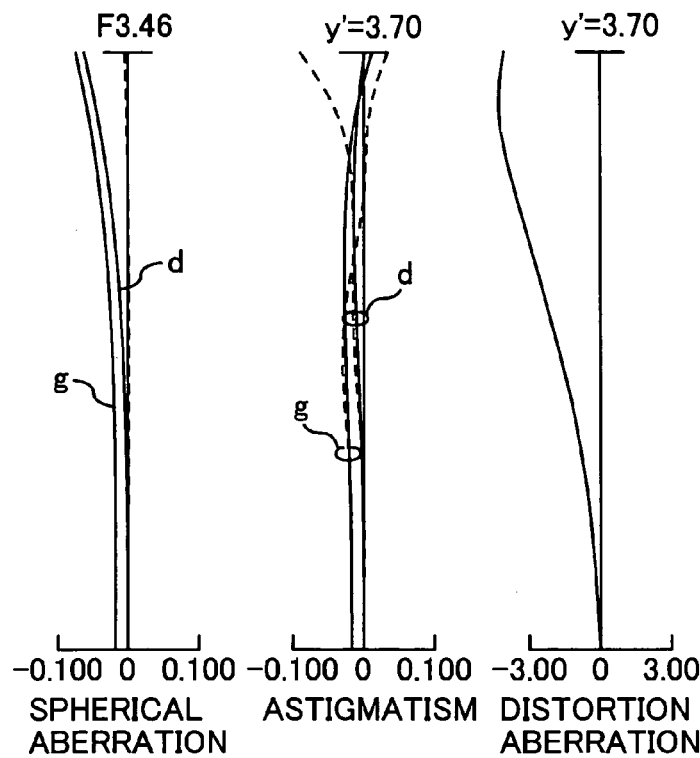
FIG. 11 is a view showing aberrations at a short focus position in the third embodiment.
Figure 11:
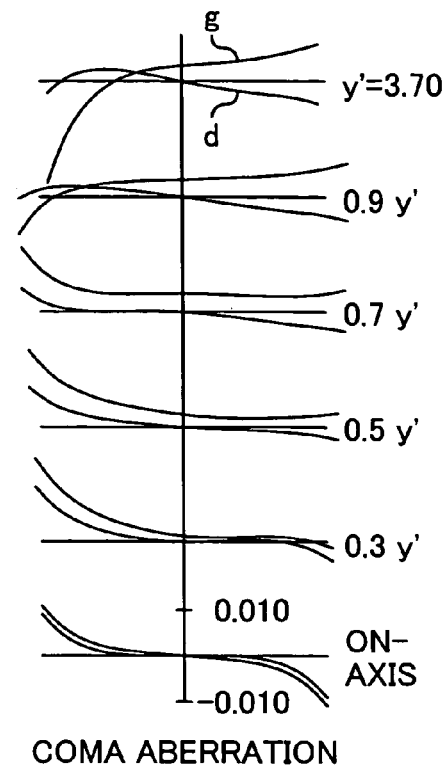
Figure 12:
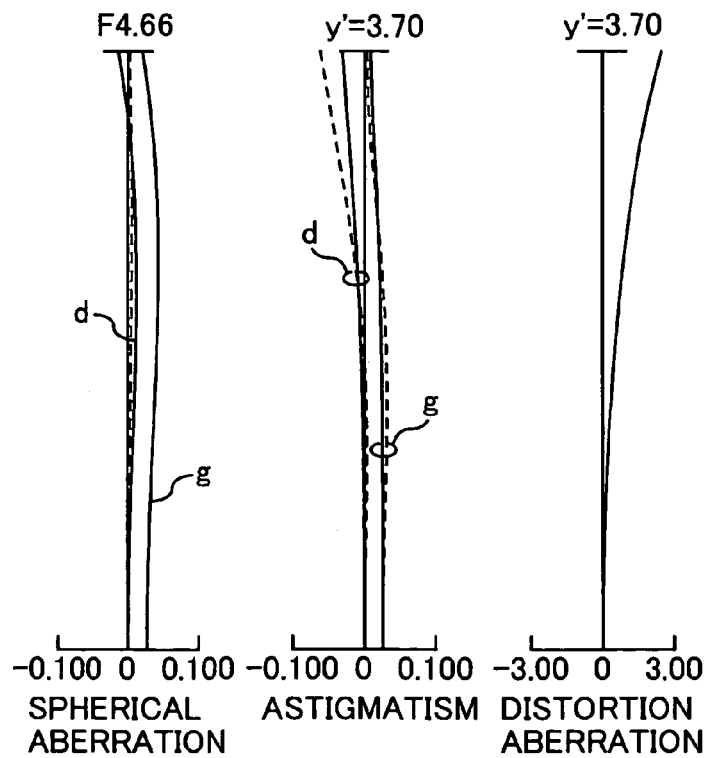
FIG. 12 is a view showing aberrations at an intermediate focal length in the third embodiment.
Figure 12:
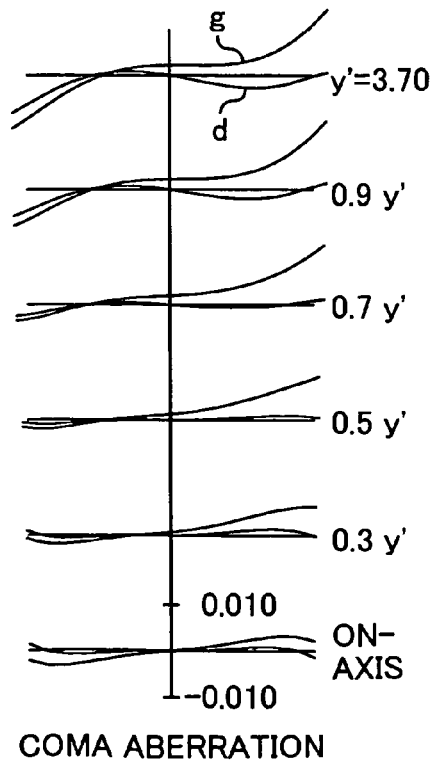
Figure 13:
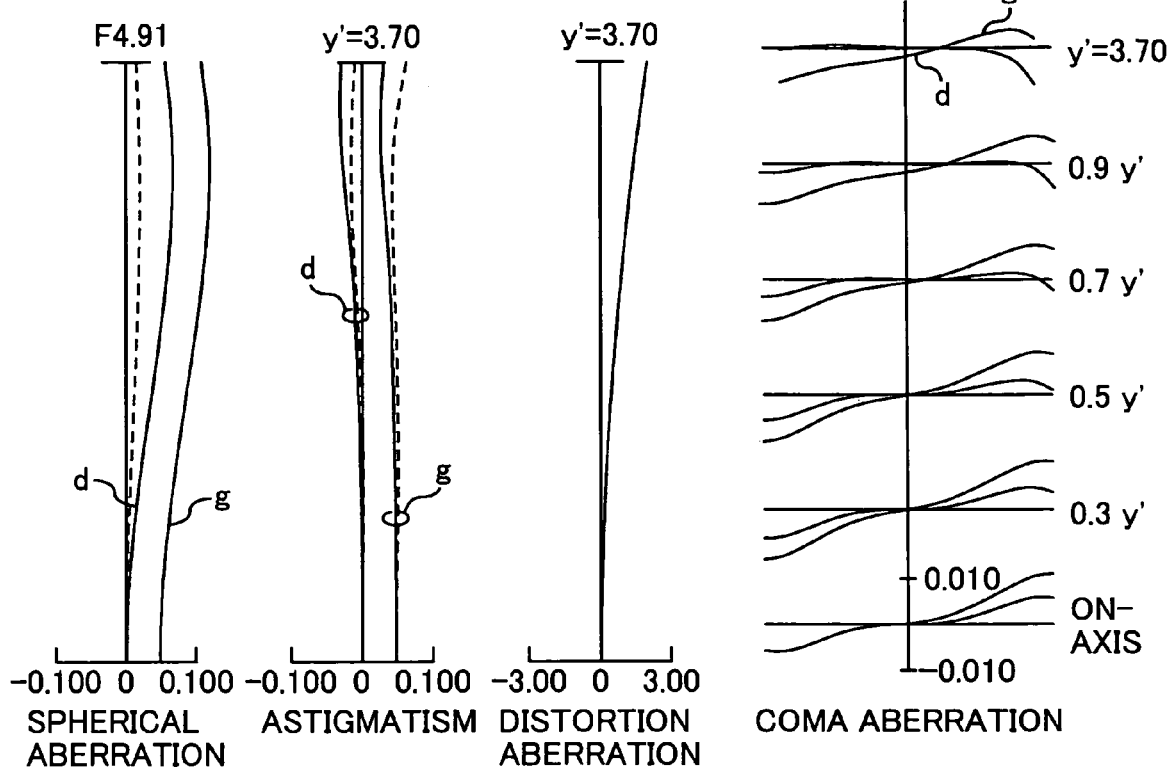
FIG. 13 is a view showing aberrations at a telephoto position in the third embodiment.

In FIG. 3 states of a wide-angle position, an intermediate focal length and a telephoto position of the third embodiment are illustrated as is the case of FIG. 1. FIGS. 11, 12 and 13 respectively show aberrations in the short focal position (wide-angle position), aberrations at the intermediate focal length and aberrations in the long focal position (telephoto position) of the third embodiment.

Fourth Embodiment $f=4.74\sim32.01$, $F=3.46\sim4.95$, $\omega=39.16\sim6.49$

| Surface No. | R | D | $N_d$ | $v_d$ | notes |
|---|---|---|---|---|---|
| 01 | 42.223 | 1.00 | 1.92286 | 18.90 | First lens |
| 02 | 28.025 | 3.30 | 1.77250 | 49.60 | Second lens |
| 03 | 264.302 | 0.10 | | | |
| 04 | 22.135 | 2.50 | 1.49700 | 81.60 | Third lens |
| 05 | 42.390 | variable (A) | | | |
| 06* | 51.753 | 0.84 | 1.80400 | 46.60 | Fourth lens |
| 07 | 4.276 | 1.97 | | | |
| 08 | 20.494 | 2.45 | 1.76182 | 26.50 | Fifth lens |
| 09 | −7.343 | 0.74 | 1.83481 | 42.70 | Sixth lens |
| 10* | 89.740 | variable (B) | | | |
| 11 | Aperture stop | variable (C) | | | |
| 12* | 8.333 | 3.11 | 1.58913 | 61.15 | Seventh lens |
| 13* | −10.000 | 0.10 | | | |
| 14 | 13.011 | 2.51 | 1.80400 | 46.60 | Eighth lens |
| 15 | −6.835 | 0.80 | 1.71736 | 29.50 | Ninth lens |
| 16 | 5.073 | variable (D) | | | |
| 17* | 12.500 | 2.11 | 1.52470 | 56.20 | Tenth lens |
| 18 | −35.588 | variable (E) | | | |
| 19 | ∞ | 0.90 | 1.51680 | 64.20 | Filter (various) |
| 20 | ∞ | | | | |

Aspheric Surface

Sixth Surface:
 $K=0.0$, $A_4=9.28299\times10^{-5}$, $A_6=1.03850\times10^{-5}$, $A_8=-2.16446\times10^{-6}$,
 $A_{10}=1.61295\times10^{-7}$, $A_{12}=-5.11846\times10^{-9}$, $A_{14}=2.475\times10^{-11}$,
 $A_{16}=2.09438\times10^{-12}$, $A_{18}=-3.35049\times10^{-14}$ Tenth Surface:
 $K=0.0$, $A_4=-5.36621\times10^{-4}$, $A_6=-2.09732\times10^{-5}$,
 $A_8=1.57517\times10^{-6}$,
 $A_{10}=-1.40290\times10^{-7}$ Twelfth Surface:
 $K=0.0$, $A_4=-5.83958\times10^{-4}$, $A_6=-2.94644\times10^{-6}$,
 $A_8=1.56092\times10^{-6}$,
 $A_{10}=-1.29023\times10^{-7}$ Thirteenth Surface:
 $K=0.0$, $A_4=3.93298\times10^{-4}$, $A_6=-9.48850\times10^{-6}$,
 $A_8=2.03692\times10^{-6}$,
 $A_{10}=-1.21118\times10^{-7}$ Seventeenth Surface:
 $K=0.0$, $A_4=-4.62968\times10^{-5}$, $A_6=1.18491\times10^{-5}$, $A_8=-5.99156\times10^{-7}$,
 $A_{10}=1.26163\times10^{-8}$ Variable Intervals

| | Short focal position f = 4.737 | Intermediate focal length f = 12.313 | Long focal position f = 32.012 |
|---|---|---|---|
| A | 0.600 | 10.683 | 19.620 |
| B | 6.980 | 3.354 | 1.200 |
| C | 4.302 | 2.750 | 1.000 |
| D | 2.077 | 8.031 | 12.425 |
| E | 3.834 | 3.020 | 2.481 |

Values of Parameters of the Condition $dsw/fT=0.134$ $X1/fT=0.591$ $X3/fT=0.281$ $|f2|/f3=0.713$ $f1/fW=8.55$ m4T=0.725 m4T/m4W=1.116

Figure 4:
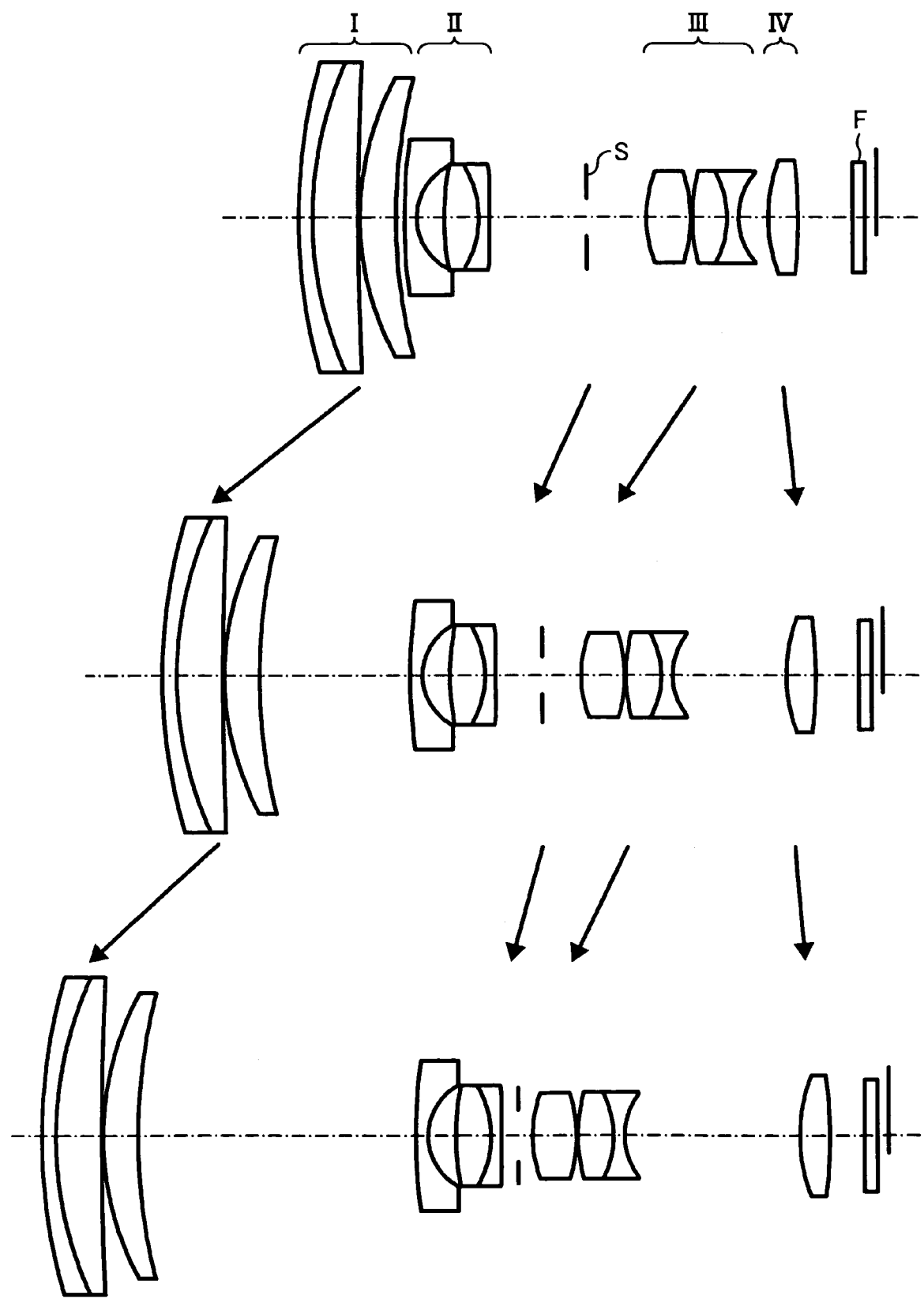
FIG. 4 is a schematic view showing a structure of lens groups of a fourth embodiment of the invention and illustrating movement of the lens groups.
Figure 14:
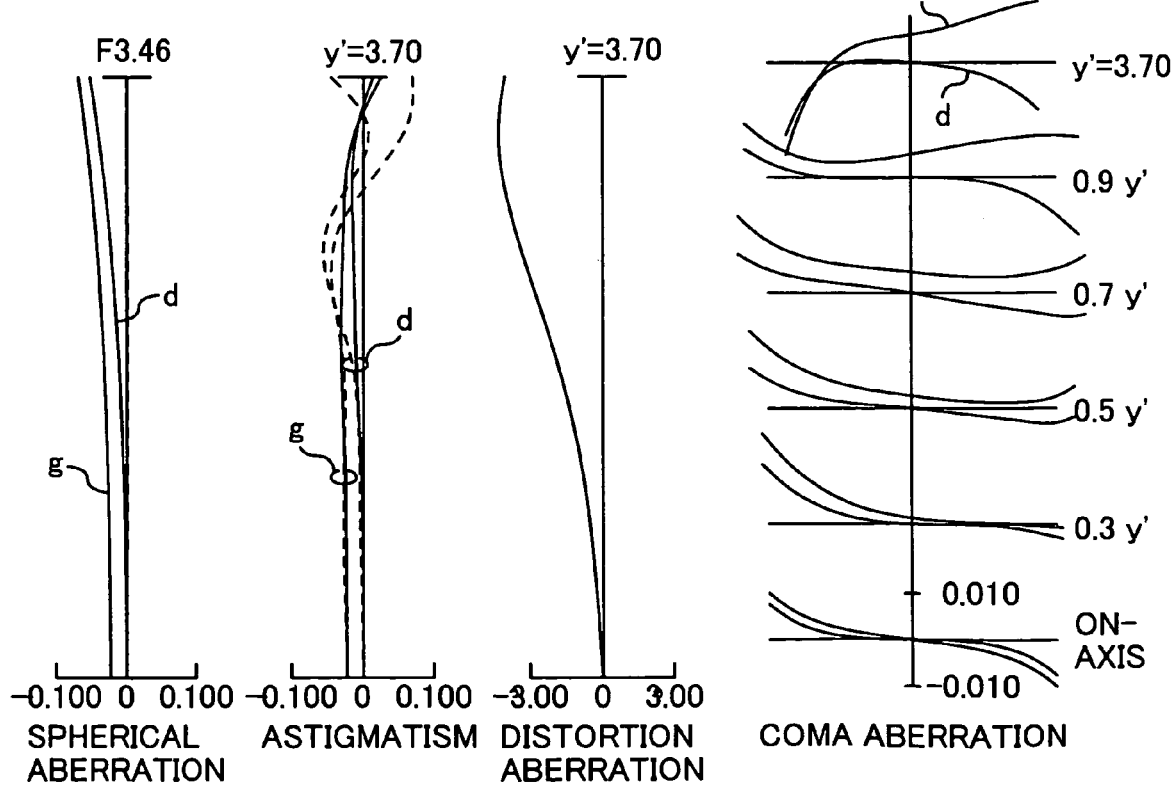
FIG. 14 is a view showing aberrations at a short focus position in the fourth embodiment.
Figure 15:
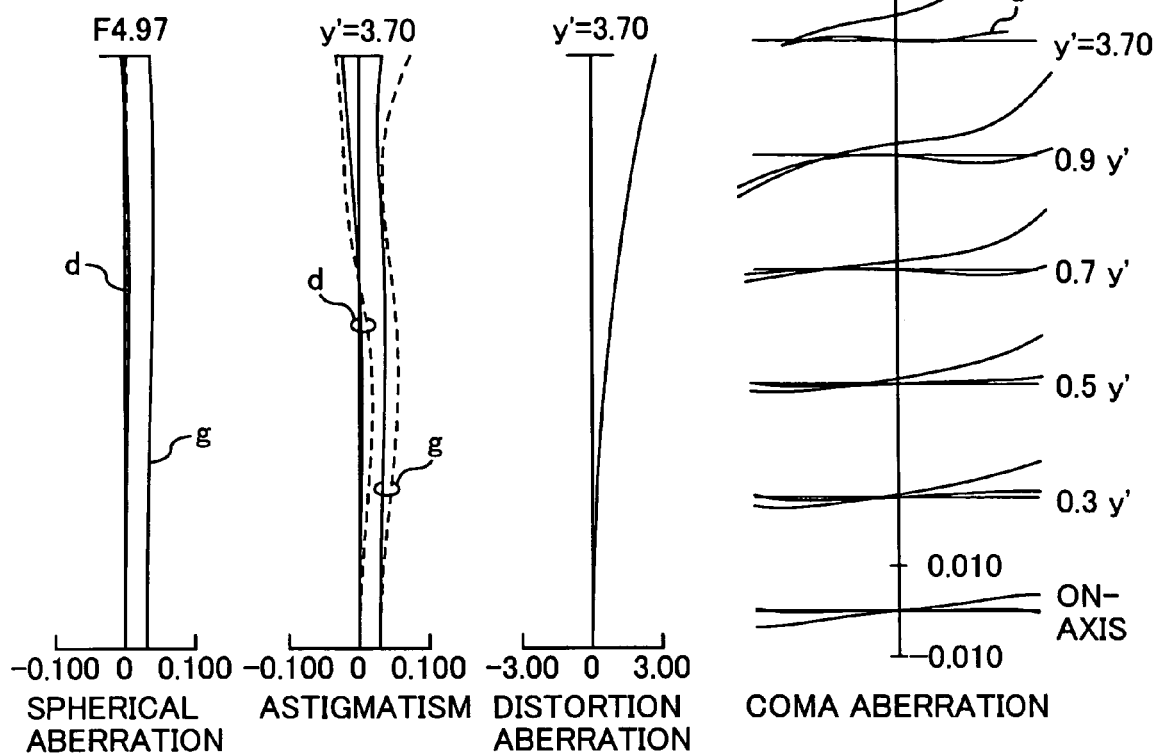
FIG. 15 is a view showing aberrations at an intermediate focal length in the fourth embodiment.
Figure 16:
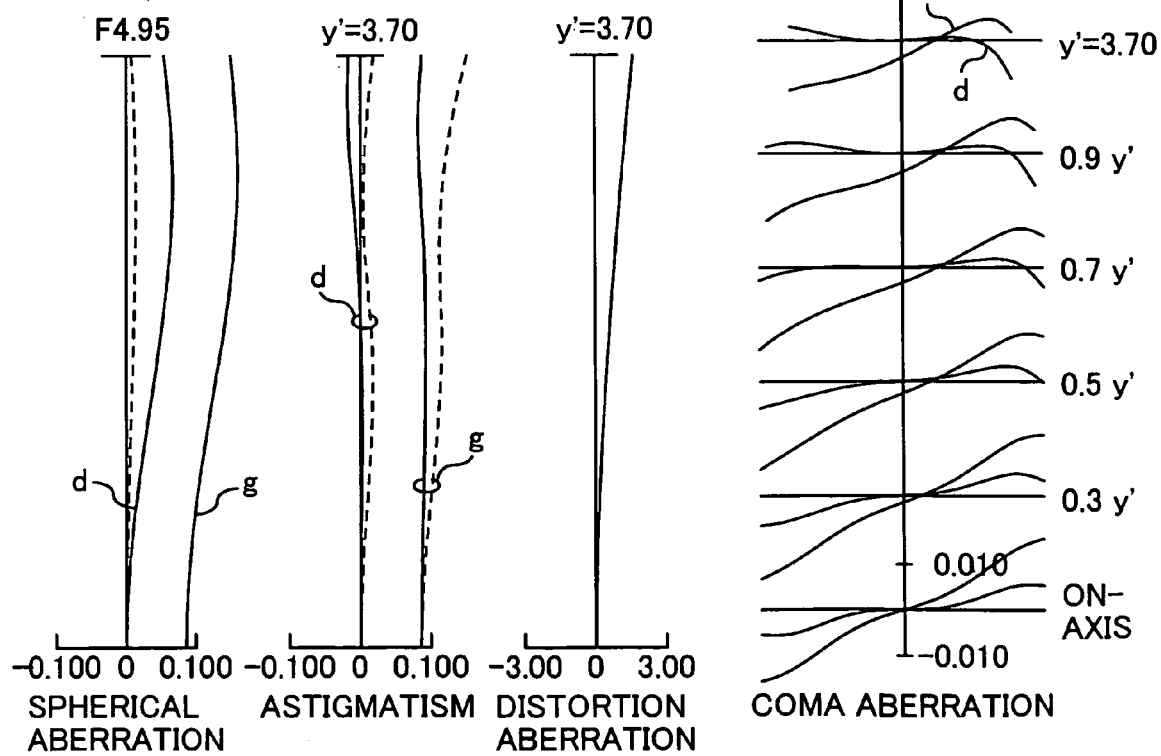
FIG. 16 is a view showing aberrations at a telephoto position in the fourth embodiment.

In FIG. 4 states of a wide-angle position, an intermediate focal length and a telephoto position of the fourth embodiment are illustrated as is the case of FIG. 1. FIGS. 14, 15 and 16 respectively show aberrations in the short focal position (wide-angle position), aberrations at the intermediate focal length and aberrations in the long focal position (telephoto position) of the fourth embodiment.

In the last instance an embodiment of an information device will be described below referring to FIGS. 17A, 17B, 17C and 18.

In this embodiment the information device is implemented as a "portable information terminal device".

As shown in FIGS. 17A, 17B, 17C and 18, the portable information terminal device 30 includes a photographing lens 31 and a light-sensitive element (area sensor) 45 as an imaging element. An "image of an object to be photographed" imaged on the light-sensitive element 45, which is formed by the photographing lens 31, is configured to be read out with the light-sensitive element 45. An electric flash 32 is mounted on the portable information terminal device 30.

As the photographing lens 31 one of zoom lenses described above is employed. Specifically, for example, any zoom lens according to the first to fourth embodiments can be employed. Also, as the light-receiving element 45 one having 4 million or over as the number of pixels can be employed. For example, a CCD area sensor having 9.1 mm for the diagonal length of the light-receiving area thereof, 2.35 μm for pixel pitch thereof and around 7 million for the number of pixels thereof, or one having 9.1 mm for the diagonal length of the light-receiving area thereof, 2 μm for pixel pitch thereof and around 10 million for the number of pixels thereof may be used as the light-sensitive element 45.

Figure 18:
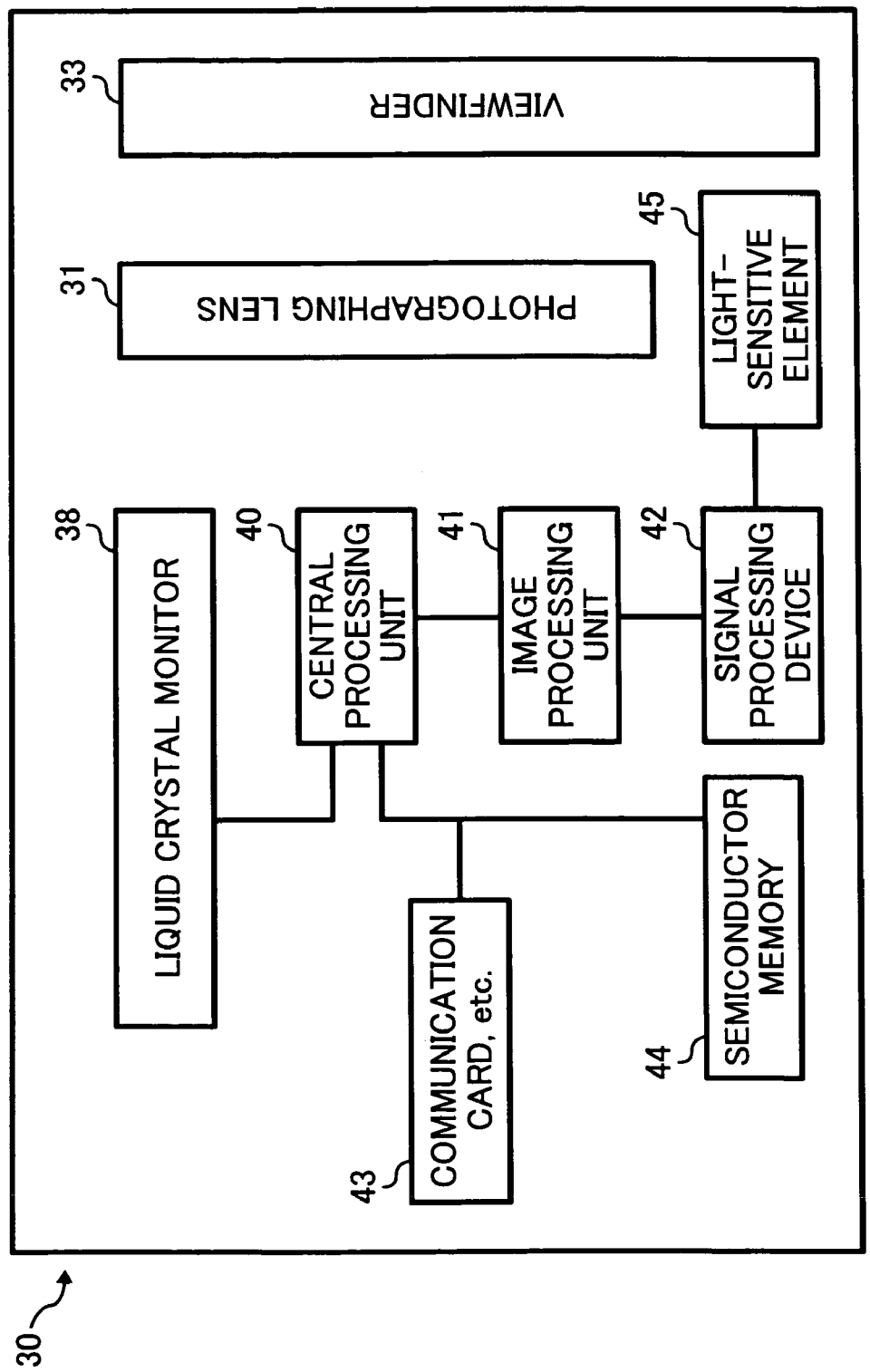
FIG. 18 is a schematic diagram showing a system of the information device in FIG. 17A.

As shown in FIG. 18 output from the light-sensitive element 45 is processed and is converted into digital information by a signal processing device 42 being under control of a central processing unit 40. The image information digitalized by the signal processing device 42 is recorded in a semiconductor memory 44 after the image information is image-processed in a predetermined manner by a image processing device 41 which is under control of a central processing unit 40. "An image which is being photographed" as well as "an image recorded in the semiconductor memory 44" can be displayed on a liquid crystal monitor 38. Also, an image recorded in the semiconductor memory 44 can be transferred to an outside device by way of a communication card 43, etc.

Figure 17A:
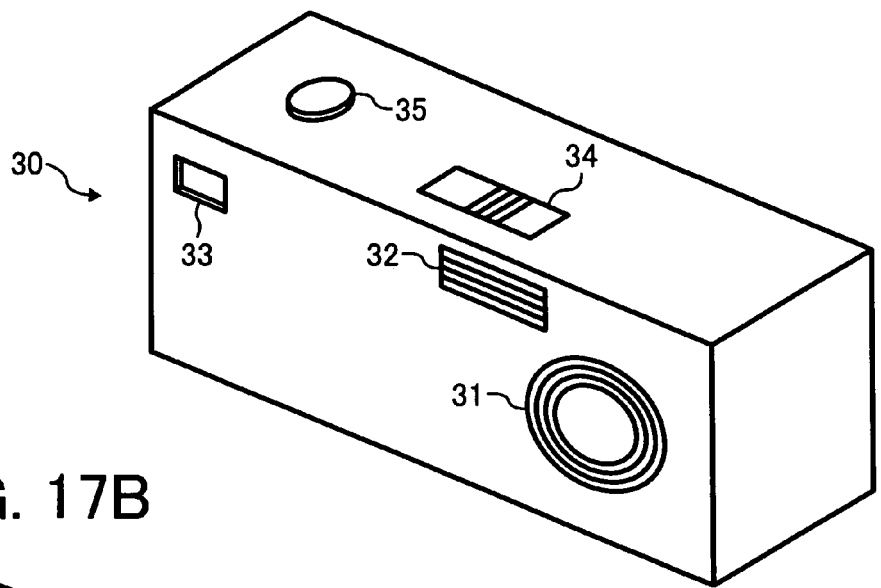
FIG. 17A is a perspective view showing a front side of an information device as one example, and a state where the lens barrel of the information device is collapsed.
Figure 17B:
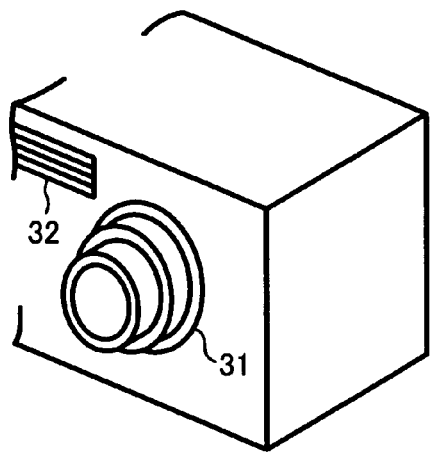
FIG. 17B is a perspective view partly showing a state where the lens barrel of the information device in FIG. 17A is extended.
Figure 17C:
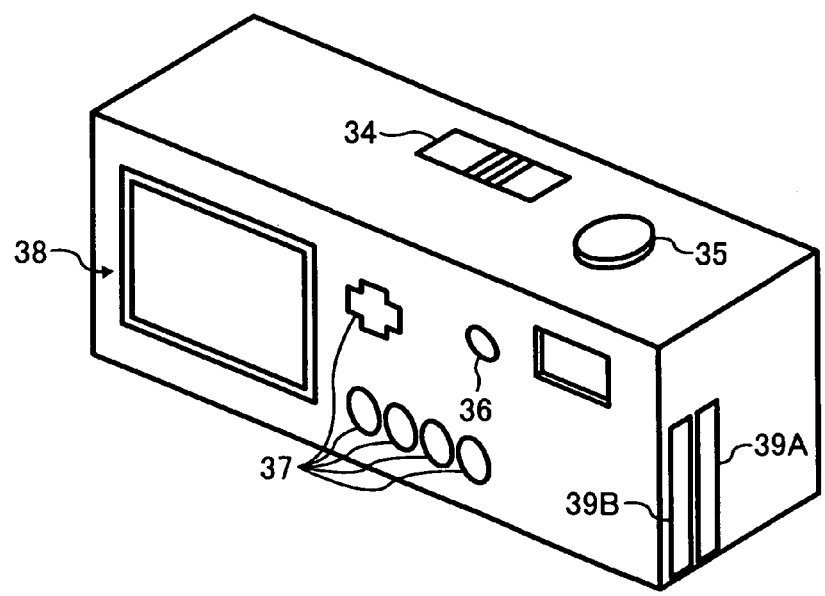
FIG. 17C is a perspective view a backside of the information device in FIG. 17A.

As shown in FIG. 17A the photographing lens 31 is in a "collapsed state" when it is borne, whereas the lens barrel thereof is extended as shown in FIG. 17B when a user turns on the power by operating a power switch 36. In this situation, the lens groups of the zoom lens in the lens barrel are, for example, in a state of a "short focal position layout". The layout of the lens groups is changed by operation of a zoom lever 34 and therefore a change in magnification power for a long focal position can be carried out. At this situation magnification power of a finder 33 may be configured to change in accordance with a change of the field angle of the photographing lens 31.

In this example focusing is carried out by a half pressing operation of the shutter button 35. When one of the zoom lenses according to the first to fourth embodiments is employed focusing can be carried out by a movement of a corresponding second/fourth lens group or a movement of the light-sensitive element 45. The photographing is carried out when the shutter button 35 is further pressed down, and the above-mentioned processes are carried out thereafter.

To display the image stored in the semiconductor memory 44 on the liquid crystal monitor 38 or to transmit it externally through the communication card 43, etc., operating buttons 37 may be operated. The semiconductor memory 44 and the communication card 43, etc. are used by loading them respectively in an exclusive-use/general purpose slot 39A/39B.

Meanwhile, each of the lens groups in the zoom lens does not necessarily have to be aligned on the optical axis when the photographing lens 31 is in the collapsed state. For example, it is possible to realize further establishment of making the information device thinner if such a mechanism is employed in which the third lens group is evacuated from the optical axis at the time of the collapsed state where "the third lens group is stored in parallel to other lens groups".

Each zoom lens according to the first to fourth embodiments can be used as a photographing lens 31 for the portable information terminal device described above, thereby it can be provided a downsized and high-resolution portable information terminal device which employs a light-receiving element having 4 million to 8 million pixels or more than 8 million pixels.

What is claimed is:

1. A zoom lens, comprising:
    a first lens group having positive refractive power, a second lens group having negative refractive power, an aperture stop, a third lens group having positive refractive power and a fourth lens group having positive refractive power which are subsequently arranged from an object side to an image side,
    wherein the first lens group and the third lens group move toward the object side in accordance with a change in magnification power as the zoom lens shifts from a wide-angle position to a telephoto position,
    the aperture stop moves independently from the lens groups next thereto, and
    a following conditional formula is satisfied:

$$0.30 < X1/fT < 0.85 \quad (1)$$

where X1 represents a total amount of a movement of the first lens group in accordance with a change in magnification power as the zoom lens shifts from the wide-angle position to the telephoto position and fT represents a focal length of an entire optical system of the zoom lens in the telephoto position.

2. The zoom lens according to claim 1, wherein the aperture stop moves so that a distance between the aperture stop and the third lens group in the wide-angle position be wider than that in the telephoto position is, and a following conditional formula is satisfied:

$$0.10 < dsw/fT < 0.25 \quad (2)$$

where dsw represents a distance between the aperture stop and a surface of the third lens group nearest to the object side on an optical axis of the zoom lens, and fT represents a focal length of an entire optical system of the zoom lens in the telephoto position.

3. A zoom lens, comprising:
    a first lens group having positive refractive power, a second lens group having negative refractive power, an aperture stop, a third lens group having positive refractive power and a fourth lens group having positive refractive power which are subsequently arranged from an object side to an image side,
    wherein the first lens group and the third lens group move toward the object side in accordance with a change in magnification power as the zoom lens shifts from a wide-angle position to a telephoto position,
    the aperture stop moves independently from the lens groups next thereto, and
    a following conditional formula is satisfied:

$$0.10 < dsw/fT < 0.25 \quad (2)$$

where dsw represents a distance between the aperture stop and a surface of the third lens group nearest to the object side on an optical axis of the zoom lens, and fT represents a focal length of an entire optical system of the zoom lens in the telephoto position.

4. The zoom lens according to claim 1, wherein the distance between the aperture stop and the third lens group becomes widest in the wide-angle position and becomes narrowest in the telephoto position.

5. The zoom lens according to claim 3, wherein the distance between the aperture stop and the third lens group becomes widest in the wide-angle position and becomes narrowest in the telephoto position.

6. The zoom lens according to claim 1, wherein a following conditional formula is satisfied:

$$0.15 < X3/fT < 0.50 \quad (3)$$

where X3 represents a total amount of a movement of the third lens group in accordance with a change in magnification power from the wide-angle position to the telephoto position, and fT represents a focal length of the entire optical system of the zoom lens in the telephoto position.

7. The zoom lens according to claim 3, wherein a following conditional formula is satisfied:

$$0.15 < X3/fT < 0.50 \quad (3)$$

where X3 represents a total amount of a movement of the third lens group in accordance with a change in magnification power from the wide-angle position to the telephoto position, and fT represents a focal length of the entire optical system of the zoom lens being in the telephoto position.

8. The zoom lens according to claim 1, wherein a following conditional formula is satisfied:

$$0.6 < |f2|/f3 < 1.0 \quad (4)$$

where f2 represents a focal length of the second lens group and f3 represents a focal length of the third lens group.

9. The zoom lens according to claim 3, wherein a following conditional formula is satisfied:

$$0.6 < |f2|/f3 < 1.0 \quad (4)$$

where f2 represents a focal length of the second lens group and f3 represents a focal length of the third lens group.

10. The zoom lens according to claim 1, wherein a following conditional formula is satisfied:

$$6.0 < f1/fW < 12.0 \quad (5)$$

where f1 represents a focal length of the first lens group and fW represents a focal length of the entire optical system of the zoom lens in the wide-angle position.

11. The zoom lens according to claim 3, wherein a following conditional formula is satisfied:

$$6.0 < f1/fW < 12.0 \quad (5)$$

where f1 represents a focal length of the first lens group and fW represents a focal length of the entire optical system of the zoom lens in the wide-angle position.

12. The zoom lens according to claim 1, wherein the fourth lens group moves so that a position thereof in the wide-angle position be closer to the image side than a position thereof in the telephoto side is, and a following conditional formula is satisfied:

$$0.60 < m4T < 0.85 \quad (6)$$

where m4T represents magnification power of imaging of the fourth lens group in the telephoto position.

13. The zoom lens according to claim 3, wherein the fourth lens group moves so that a position thereof in the wide-angle position be closer to the image side than a position thereof in the telephoto side is, and a following conditional formula is satisfied:

$$0.60 < m4T < 0.85 \quad (6)$$

where m4T represents magnification power of imaging of the fourth lens group in the telephoto position.

14. The zoom lens according to claim 12, wherein a following conditional formula is satisfied:

$$1.0 < m4T/m4W < 1.3 \quad (7)$$

where m4W represents magnification power of imaging of the fourth lens group in the wide-angle position, and m4T represents magnification power of imaging of the fourth lens group in the telephoto position.

15. The zoom lens according to claim 13, wherein a following conditional formula is satisfied:

$$1.0 < m4T/m4W < 1.3 \quad (7)$$

where m4W represents magnification power of imaging of the fourth lens group in the wide-angle position, and m4T represents magnification power of imaging of the fourth lens group in the telephoto position.

16. The zoom lens according to claim 1, wherein the second lens group includes three lenses:
 a negative lens which has a surface having a large curvature, the surface facing toward the image side;
 a positive lens which has a surface having a large curvature, the surface facing toward the image side; and
 a negative lens has a surface having a large curvature, the surface facing toward the object side;
 which are subsequently arranged from the object side to the image side.

17. The zoom lens according to claim 3, wherein the second lens group includes three lenses:
 a negative lens which has a surface having a large curvature, the surface facing toward the image side;
 a positive lens which has a surface having a large curvature, the surface facing toward the image side; and
 a negative lens has a surface having a large curvature, the surface facing toward the object side;
 which are subsequently arranged from the object side to the image side.

18. The zoom lens according to claim 1, wherein the second lens group remains unmoved during a change in the magnification power from the wide-angle position to the telephoto position.

19. The zoom lens according to claim 3, wherein the second lens group remains unmoved when during a change in the magnification power from the wide-angle position to the telephoto position.

20. The zoom lens according to claim 1, wherein during a change in the magnification power from the wide-angle position to the telephoto position the second lens group moves so that the second lens group in the telephoto position be located closer to the image side than that in the wide-angle position is.

21. The zoom lens according to claim 3, wherein during a change in the magnification power from the wide-angle position to the telephoto position the second lens group moves so that the second lens group in the telephoto position be located closer to the image side than that in the wide-angle position is.

22. An information device, comprising the zoom lens according to claim 1 as a photographing optical system thereof.

23. An information device comprising the zoom lens according to claim 3 as a photographing optical system thereof.

* * * * *